(12) United States Patent
Wexelblat

(10) Patent No.: US 7,222,158 B2
(45) Date of Patent: May 22, 2007

(54) THIRD PARTY PROVIDED TRANSACTIONAL WHITE-LISTING FOR FILTERING ELECTRONIC COMMUNICATIONS

(75) Inventor: David Eli Wexelblat, Vienna, VA (US)

(73) Assignee: AOL LLC, Dulles, VA (US)

( * ) Notice: Subject to any disclaimer, the term of this patent is extended or adjusted under 35 U.S.C. 154(b) by 227 days.

(21) Appl. No.: 10/748,122

(22) Filed: Dec. 31, 2003

(65) Prior Publication Data
US 2005/0144279 A1  Jun. 30, 2005

(51) Int. Cl.
*G06F 15/16* (2006.01)
(52) U.S. Cl. .................................. 709/206; 709/217
(58) Field of Classification Search ................. 709/206
See application file for complete search history.

(56) References Cited

U.S. PATENT DOCUMENTS

| | | | | |
|---|---|---|---|---|
| 4,425,665 A * | 1/1984 | Stauffer | ....................... | 375/223 |
| 4,638,356 A * | 1/1987 | Frezza | ....................... | 380/200 |
| 5,487,100 A | 1/1996 | Kane | | |
| 5,884,033 A * | 3/1999 | Duvall et al. | ............... | 709/206 |
| 5,944,786 A * | 8/1999 | Quinn | ....................... | 709/206 |
| 5,987,508 A * | 11/1999 | Agraharam et al. | ........ | 709/217 |
| 5,987,606 A | 11/1999 | Cirasole et al. | | |
| 5,999,932 A * | 12/1999 | Paul | ........................... | 707/10 |
| 6,052,709 A * | 4/2000 | Paul | ........................... | 709/202 |
| 6,112,227 A * | 8/2000 | Heiner | ....................... | 709/203 |
| 6,249,805 B1 * | 6/2001 | Fleming, III | ............... | 709/206 |
| 6,321,267 B1 * | 11/2001 | Donaldson | ................. | 709/229 |
| 6,336,117 B1 * | 1/2002 | Massarani | ................. | 707/100 |
| 6,542,943 B2 * | 4/2003 | Cheng et al. | ............... | 710/36 |
| 6,546,416 B1 * | 4/2003 | Kirsch | ........................ | 709/206 |
| 6,549,416 B2 * | 4/2003 | Sterner et al. | ............... | 361/727 |
| 6,600,750 B1 * | 7/2003 | Joffe et al. | ................... | 370/401 |
| 6,650,890 B1 | 11/2003 | Irlam et al. | | |
| 6,654,787 B1 | 11/2003 | Aronson et al. | | |
| 2002/0078158 A1 * | 6/2002 | Brown et al. | ............... | 709/206 |
| 2002/0132607 A1 * | 9/2002 | Castell et al. | ............... | 455/412 |
| 2002/0143770 A1 * | 10/2002 | Schran et al. | ................. | 707/10 |

(Continued)

OTHER PUBLICATIONS

Learning Spam: Simple Techniques for Freely-Available Software, Massey, B., et al. USENIX 2003 Annual Technical Conference, p. 63-76.*

(Continued)

*Primary Examiner*—Beatriz Prieto
(74) *Attorney, Agent, or Firm*—Fish & Richardson P.C.

(57) ABSTRACT

It is useful to provide a mechanism to allow, at least temporarily, communications to occur without blocking between a first entity and a second entity with whom communications with the first entity are likely/anticipated and desirable, generally through use of a white-list having transactional entries. For example, to allow communications between a communications user and an intended recipient, the user may be added to global and/or personal white-lists for or until a specified transaction or duration. Thereafter, the user may be removed from the white-lists upon occurrence of an end trigger, which may include an event or expiration of a specified time. The disclosed systems and methods thus permit the transactional white-listing of users for a limited time necessary to ensure the intended recipient receives the anticipated communications. Thereby, the systems and methods guard against the anticipated communications being accidentally blocked as spam by other communications filters.

51 Claims, 14 Drawing Sheets

U.S. PATENT DOCUMENTS

| | | | |
|---|---|---|---|
| 2003/0023736 A1* | 1/2003 | Abkemeier | 709/229 |
| 2003/0167311 A1* | 9/2003 | Kirsch | 709/206 |
| 2003/0172167 A1* | 9/2003 | Judge et al. | 709/229 |
| 2003/0172291 A1* | 9/2003 | Judge et al. | 713/200 |
| 2003/0172294 A1* | 9/2003 | Judge | 713/200 |
| 2003/0191969 A1* | 10/2003 | Katsikas | 713/201 |
| 2003/0212791 A1* | 11/2003 | Pickup | 709/225 |
| 2003/0236847 A1* | 12/2003 | Benowitz et al. | 709/206 |
| 2004/0044996 A1* | 3/2004 | Atallah | 717/169 |
| 2004/0176072 A1* | 9/2004 | Gellens | 455/412.1 |

OTHER PUBLICATIONS

PHEmail: Designing a Privacy Honoring Email System, Nguyen, D., CHI 2003, New Horizons, Apr. 2003, ACM 1-58113-637-4/03, p. 922-928.*

Internet is losing ground in the Battle against Spam, The New York Times, NyTimes.com, Apr. 2003, 1-4.*

Secure and Resilient Peer-to-Peer Email: Design and Implementation, Kangasharju, J., et. al. Proceedins of 3rd Intl Confer on Peer-to-Peer Computing P2P '03, IEEE 0-7695-203-5/03, p. 1-8.*

WebGuard: Web based Adult content detection and Filtering System, Hammami, M., et. al. Proceedings of the IEEE/WIC (WI'03) IEEE 0-7695-1932-6/03, p. 1-5.*

A Three-Party HTTP Proxy to Support Internet Content Regulation, Agung P., et. al., Journal Title: Australasian Conference on Information Security and Privacy, Date: 2000, p. 1-7.*

RFC 2822: Internet Message Format, Resnick, P., Apr. 2001.*

Mastering Office 97 Professional ed, Microsoft, Moseley, L.E., et. al., Sybex Inc., 1997, ISBN 0-7821-1925-5, Chapter 33-The Basics of Outlook, p. 753-763.*

Using Netscape 2™, Special Ed, Brown, M.R., QUE® Corporation, 1995, Jan. 1996, Chapter 13: Email with Netscape, p. 327-352.*

Admediation: New Horizons in Effective Email Advertising, Communications of the ACM archive, vol. 44, issue 12, Dec. 2001, pp. 91-96, ISSN:0001-0782.*

Privacy Recovery with Disposable Email Addresses, IEEE Security Privacy, 2003, ISBN 1540-7993/03, p. 35-39.*

An Analysis of Spam Filters, A Mayor Qualifying Project Report, Worcester Polytechnic Institue, Apr. 2003.*

PCT—International Search Report dated May 26, 2005.

* cited by examiner

| Information Request - Moving to Centerville | — | ☐ | X |

Please indicate, by checking the appropriate boxes, the items for which you would like additional information.

☒ Reality Agencies
☐ All Elementary Schools (Grades 1-6)
☐ All Jr. High Schools (Grades 7-9)
☐ All High Schools (Grades 10-12)
   ☒ Private High School
   ☐ Public High School
☐ All Utility Companies
   ☒ Electric
   ☐ Water
   ☐ Gas
   ☐ Trash ☐ Crime Statistics
☐ Moving Companies
☐ Area Maps
☐ Moving to Centerville Brochure
☐ Phone Companies
☐ Cable/Dish Companies
☐ Newspaper Subscribers
☐ Job Hotline

[ SUBMIT ]  [ CANCEL ]

FIG. 7

THIRD PARTY PROVIDED TRANSACTIONAL WHITE-LISTING FOR FILTERING ELECTRONIC COMMUNICATIONS

TECHNICAL FIELD

The following description generally relates to electronic communications and, more particularly, to the use of white-listing to permit electronic communications between entities.

BACKGROUND

As the use of electronic communications, such as e-mail communications, has increased, so has the occurrence of unsolicited bulk communications, also called spam. While spam often is commercial in nature, it also includes non-commercial bulk communications, such as political or non-profit communications sent to large numbers of electronic communication users. To control and prevent spam, communication users employ spam filter systems. Two types of spam filter systems are black-listing systems and white-listing systems. A black-listing system maintains a list, called a black-list, of user names, e-mail addresses, domain names, or other identifying information for communication users such as these who are known or likely to send spam. Black-listing systems block communications from any user who appears on the black-list. Conversely, a white-listing system works by maintaining a list, called a white-list, of user names, e-mail addresses, domain names, or other identifying information for approved communication users. White-listing systems accept communications from any user who appears on the white-list.

SUMMARY

In one general aspect, transactional white-listing to facilitate electronic communications includes receiving an out-of-band communication from a third-party service provider in response to an action by an intended communications recipient. The out-of-band communication contains information identifying an expected communications sender and an intended communications recipient. The expected communications sender sends communications to the intended communications recipient over a communication channel other than the channel through which the out-of-band communication was received. If the identifying information for the expected communications sender does not appear in a white-list associated with the intended communications recipient, it is added to the white-list associated with the intended communications recipient.

Implementations may include one or more of the following features. For example, upon expiration of a specified time period, the identifying information for the expected communications sender may be deleted from the white-list associated with the intended communications recipient. If the identifying information for the intended communications recipient does not appear in a white-list associated with the expected communications sender, such identifying information may be added to the white-list associated with the expected communications sender. The identifying information may be an e-mail address, an IM screen name, an IP address, a MAC address, or a domain name.

Further, upon receipt of a communication from the expected communications sender, the communication may be sent to the intended communications recipient. The received communication may be an e-mail, an instant message, a telephone call, or a message posted to an online message board. After sending the communication to the intended communications recipient, the identifying information for the expected communications sender may be deleted from the white-list associated with the intended communications recipient. The intended communications recipient also may be notified that the expected communications sender is scheduled to be removed from the white-list. In such a case, the intended communications recipient may be asked whether the expected communications sender should be kept in the white-list.

In another general aspect, transactional white-listing includes receiving a communication from a third-party service provider over an out-of-band communication channel. The out-of-band communication, which identifies an expected e-mail sender and an intended e-mail recipient, is received by a communications service provider associated with the intended e-mail recipient. The transactional white-listing further includes determining whether the communication service provider has a global white-list for e-mail filtering. If the communications service provider has a global white-list, information identifying the expected e-mail sender and a transactional identifier is automatically added to the global white-list. Similarly, the transactional white-listing also determines whether the intended e-mail recipient has a personal white-list for e-mail filtering. If the intended e-mail recipient has a personal white-list, the information identifying the expected e-mail sender and the transactional identifier is automatically added to the personal white list of the intended e-mail recipient.

In some implementations, automatically adding information identifying the expected e-mail sender and a transactional identifier to the global white-list includes adding a type indicator, the type indicator permitting special handling of in-band communications. Implementations may involve determining whether the communications service provider has a global black-list for e-mail filtering and whether the expected e-mail sender is blocked by the global black-list from sending e-mail to the intended recipient. If the expected e-mail sender is blocked by a global black-list, the global black-list automatically is modified to permit the expected e-mail sender to send e-mail to the intended e-mail recipient. It further is determined whether the intended e-mail recipient has a personal black-list for e-mail filtering and whether the expected e-mail sender is blocked by the personal black-list from sending e-mail to the intended recipient. If the expected e-mail sender is blocked by the personal black-list, the personal black-list automatically is modified to permit the expected e-mail sender to send e-mail to the intended e-mail recipient.

In other general aspects, automatically adding an e-mail address of a e-mail sender to a list of approved e-mail sender addresses associated with an intended e-mail recipient, where the e-mail address of the e-mail sender is provided by a third party service provider sending an out-of-band communication to a communications service provider associated with the intended recipient and where the out-of-band communication is provided in response to an action by the intended e-mail recipient, includes receiving an out-of-band communication from a third-party service provider. The out-of-band communication specifies an e-mail address of an e-mail sender and an e-mail address of an intended e-mail recipient. The e-mail address of the e-mail sender is added to a list of approved e-mail sender addresses associated with the intended e-mail recipient, whereby the intended e-mail recipient can receive e-mail from the e-mail sender. The e-mail address of the e-mail sender is deleted from the list of approved e-mail sender addresses associated with the intended e-mail recipient upon completion of a specified end trigger.

Some implementations involve adding a transactional identifier, time stamp, or expiration date to the list. Further, the out-of-band communication may be received over a virtual private network or using a remote procedure call.

The specified end trigger may be an out-of-band communication from the third party service provider indicating that the e-mail address for the e-mail sender should be removed from the list of approved e-mail sender addresses associated with the intended e-mail recipient. The specified end trigger may be expiration of an expiration date, expiration of a specified time duration, receipt of an e-mail by the intended e-mail recipient, or receipt of a threshold number of e-mails from the e-mail sender. It may be initiated by the third-party service provider or by an e-mail service provider.

In another general aspect, automatically configuring a white-list communications filter associated with a communications user includes a communications gateway configured to receive out-of-band communications from one or more authorized third-party service providers. It further includes a communications filter system that maintains a white-list communications filter identifying trusted communication sources, and a means for automatically configuring the white-list communications filter based on the out-of-band communications received by the communications gateway. One additional feature in some implementations includes a means for permitting manipulation of the communications filter system by a user.

In yet another general aspect, facilitating electronic communications involves receiving an out-of-band communication identifying a first communications user that is expected to send communications to an identified second communications user. Based on the received out-of-band communication, a white-list is configured to temporarily permit communications from the first communications user to be received by the second communications user. A black-list is configured to temporarily prevent communications from the first communications user from being blocked by the black-list.

Other general aspects of transactional communications filtering includes receiving an out-of-band communication identifying an expected communications sender and an intended communications recipient. The out-of-band communication indicates that the expected communications sender should be permitted to send communications to the intended communications recipient for a set transactional period. If communications sent to the intended communications recipient is filtered through a global white-list or a personal white-list, transactional information identifying the expected communications sender is added to the global white-list and the personal white-list. If such communications also are filtered through a global black-list that would prevent receipt of communications from the expected communications sender, a transactional exception for the expected communications sender is automatically created in the global black-list, whereby the created exception prevents the global black-list from blocking communications from the expected communications sender. Likewise, if communications sent to the intended communications recipient is filtered through a personal black-list that would prevent receipt of communications from the expected communications sender, a transactional exception for the expected communications sender is created in the personal black-list, whereby the created exception prevents the personal black-list from blocking communications from the expected communications sender.

The out-of-band communication, in some implementations, includes a transactional identifier. One implementation further includes, upon occurrence of an end trigger, removing the transactional information from the global and personal white-lists and removing the transactional exception from the global and personal black-lists. An option may be presented to allow the intended communications recipient to make the transactional information in the global and personal white-lists and the transactional exception in the global and personal black-list permanent, whereby the expected communications sender is permitted to send communications to the intended recipient after the conclusion of a set transactional period.

The personal white-list may be maintained on a server associated with a communications service provider that provides communication services to the intended communications recipient, or it may be maintained on a local device used by the intended communications recipient. The local device may be a personal computer, a personal digital assistant, or a cellular phone.

Another general aspect of facilitating electronic communications between two entities includes receiving an out-of-band communication from an authorized third-party source, wherein the out-of-band communication contains information identifying an expected communications sender and an intended communications recipient. Based on the received out-of-band communication, the identifying information for the expected communications sender is added to a list of approved communications senders associated with the intended communications recipient.

DESCRIPTION OF DRAWINGS

Throughout the drawings, reference numbers are re-used to indicate correspondence between referenced elements. Additionally, the first digit of each three-digit reference number and the first two digits of each four-digit reference number generally indicate the figure in which the element first appears.

FIGS. 5, 6, 7, and 8 are example user interfaces that may employ a transactional white-listing system.

DETAILED DESCRIPTION

Figure 1:
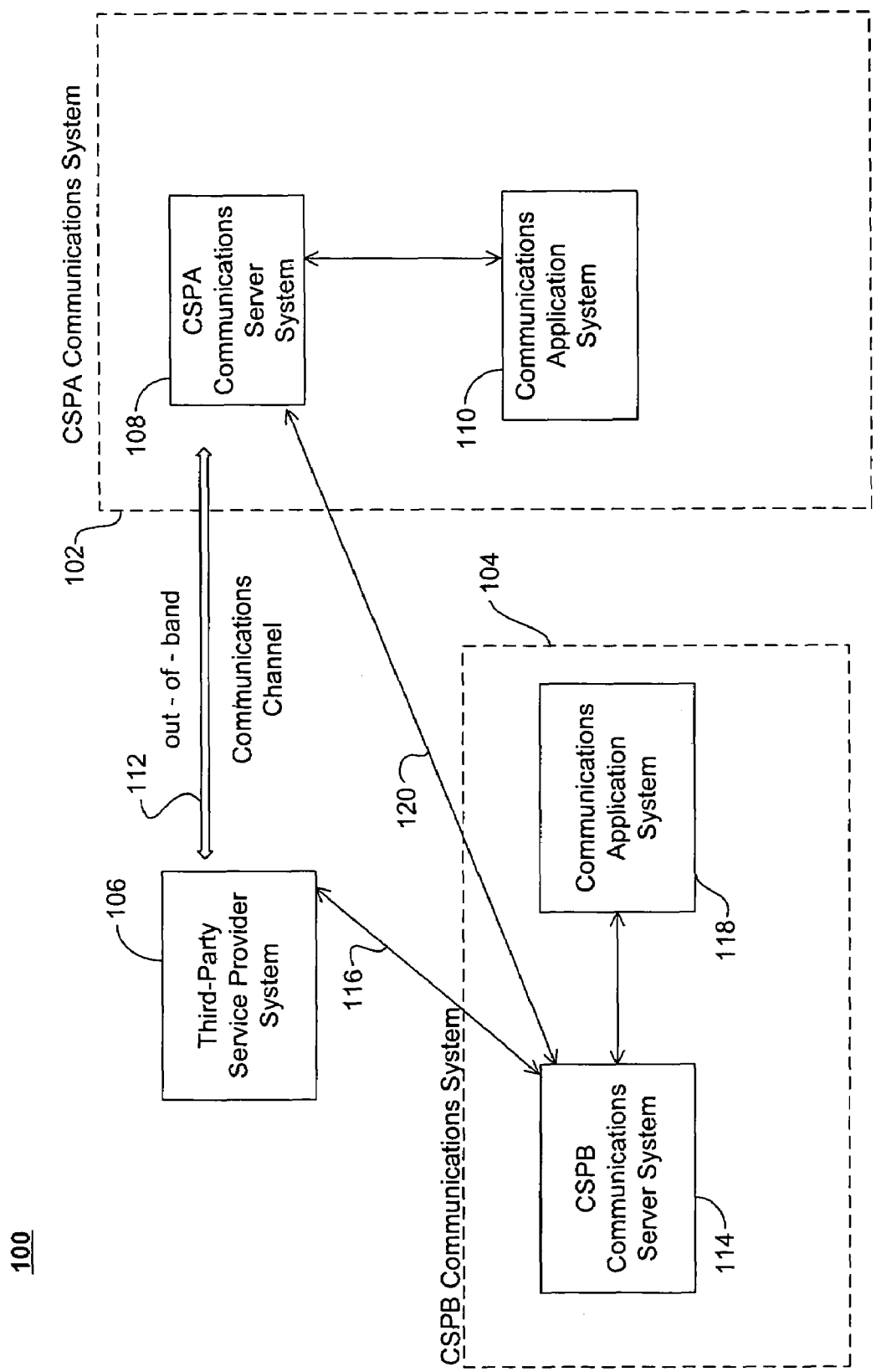
FIG. 1 is a high-level block diagram of a transactional white-listing system.

It is useful to provide a mechanism to allow, at least temporarily, communications to occur without blocking between a first entity and a second entity with whom communications with the first entity are likely/anticipated and desirable, generally through use of a white-list having transactional entries. For example, to allow communications between a communications user and an intended recipient, the user may be added to a white-list for or until a specified transaction or duration. The addition of a user to a white-list may occur in response to a start trigger indicating that desirable or non-spam communications likely will be received from the user during some temporary period or on/before some triggering event. To ensure open communications, the user may be added to global and personal white-lists associated with the intended recipient. Thereafter, the user is removed from the global and personal white-lists upon occurrence of an end trigger, which may include an event (such as receipt of the communication) or expiration of a specified period of time or time threshold. Thus, the disclosed systems and methods permit the transactional white-listing of users for a limited time necessary to ensure the intended recipient receives the anticipated communications.

The transactional white-listing systems and methods guard against the anticipated communications being accidentally marked or blocked as spam by other communications filters. They also prevent cluttering white-lists with information about users with whom the intended recipient interacts in a finite number of transactions or for only a time-limited transaction. In many implementations, this transactional white-listing is performed without the need for input from the intended recipient, who may or may not be aware of the transactional white-listing done on his behalf. Throughout the description references to automatic actions may correspond to actions taken without individual user intervention or actions taken without required user action.

In one implementation, in response to the start trigger, a third-party service provider notifies a communications service provider (CSP) associated with the intended recipient of the need to white-list an expected sending user. That notification may be provided using an out-of-band or back channel connection between the third-party service provider and the CSP. The out-of-band communication data thus is provided independent of the future communication. The CSP adds information identifying the sending user to any existing global white-lists with a transactional identifier to allow the CSP to later remove the sending user upon occurrence of an end trigger. The CSP then adds the identifying information for the sending user and the transactional identifier to the personal white-lists of the intended recipient. Generally, this process is transparent to both the sending user and the intended recipient. The process also may check any global and personal black-lists to determine whether the sending user appears in any black-list. If the user appears in any such black-list, the process may create an exception in the black-list or inactivate the entry in the black-list(s) to ensure that communications from the sending user are received by the intended recipient.

Thereafter, upon satisfaction of the temporary condition, identifying information for the temporarily white-listed sender may be removed from any global or personal white-lists associated with the intended recipient. Specifically, upon occurrence of an end trigger, the CSP removes identifying information for the white-listed sender from the global and personal white-lists associated with the intended recipient. Furthermore, if previously excepted, removed, or inactivated from a black-list, identifying information for the sending user also is reentered or reactivated in the black-list. The end trigger may be, for example, another communication from the third-party service provider, the expiration of a specified duration, or the occurrence of a specified transaction or event. In one implementation, the specified duration may be potentially infinite, or may be set by another event or condition. For example, the duration may be specified to be "as long as the intended recipient maintains an account with the third-party service provider." Examples of the third-party service providers include any third-party provider of online or World Wide Web (Web) based services, such as ebay.com or amazon.com. The CSPs include providers of communication services, such as America Online (AOL), Yahoo, or Microsoft Networks (MSN) Hotmail.

Examples of the disclosed systems and methods to white-list expected sending users exists in many differing contexts. One such context is an online auction website, such as ebay.com, where a potential buyer of an item being sold wishes to ask the seller a question. Because some online auctions do not disclose the contact information of the seller, it may be difficult for conventional systems to guarantee that the communications system of an inquiring potential buyer will not block responsive communications sent by the seller, even though the potential buyer clearly desires to receive such communications. By the contrast, however, the disclosed white-listing systems and methods provide a way to ensure that the potential buyer can receive communications from the seller even though the potential buyer does not know the contact information of the seller and may not know the identity of the seller. In this context, through out-of-band communications between ebay.com and the communications system of the inquiring potential buyer, the seller may be transactionally white-listed for the potential buyer when the potential buyer indicates a desire to ask the seller a question.

Another example is the use of the systems and methods in an information request context. In that context, a requestor who requests information from an online source, such as by completing a website information request form, can receive responsive communications from entities associated with the online source. One specific instance involves submission by a requester of a request for information about a locale that the requestor anticipates moving to or visiting during a upcoming vacation. For example, a user contemplating a move to a new area of the United States may visit a website for that area, such as a city or chamber of commerce website, and fill out a form to receive more information from local realtors, schools, or utility companies. Such a request for information may prompt the white-listing of more than one of those or other entities to enable responses to the requested information. It may involve white-listing local realty companies as well as local schools and utility companies. Such information requests also may be made about consumer products or health related problems by completing request forms from appropriate websites. Using the disclosed systems and methods, one or more entities may be transactionally white-listed to ensure the appropriate response(s) to such information requests.

Yet another example involves online purchases. For example, a purchaser of an airplane ticket may want to receive communications from the airline about the ticket up through the return date of the ticket. This would allow the purchaser to receive communications informing of any cancellations or scheduling problems with the purchaser's flights. In this instance, a third-party service provider, such as travelocity.com or expedia.com, may send out-of-band communications to white-list the domain of the particular airline for which the purchaser bought the ticket (e.g., Delta, Southwest, American Airlines). Likewise, an online purchaser of a pair of shoes may wish to receive communications related to their purchase, such as a confirmation receipt or shipping information. In both situations, the disclosed systems and methods may be used to transactionally white-list the appropriate entities for a specified duration, such as until the date of the return airplane flight or until the shipment is delivered.

These and other features will be described now with reference to the drawings identified above. The drawings and their associated descriptions are provided to illustrate various implementation-specific details, and not to limit the scope of the invention set forth in the appended claims. For the sake of explanation, some drawings may illustrate concepts as embodying separate components. As understood by one of ordinary skill, however, the substitution of a single component for the shown components does not necessarily render the substitution different from the shown implementation. Additionally, for simplicity, the drawings may show some components as single entities when, as understood by one of ordinary skill, such components may be implemented in multiple instances of the components. For example, a server or database may be illustrated as a single entity though implemented across multiple servers or databases. Further, although the drawings do not show the presence of a network or web, it is understood that any of the shown connections between the illustrated components and systems may occur over a network, the Internet, or the Web.

I. System Overview

FIG. 1 is a high-level block diagram of one implementation of a transactional white-listing system 100 incorporating CSPA communications system 102, CSPB communications system 104, and third-party service provider system 106. In the shown implementation, CSPA communications system 102 includes CSPA communications server system 108 and communications application system 110. CSPA communications server system 108 is configured to facilitate electronic communications between a subscribing CSPA user and other entities and persons. These communications often occur over the Internet or the Web. The communications may involve e-mail, instant messaging (IM), chat or message boards, voice mail, caller identifier (ID), or any facilitated peer-to-peer communications. For example, in an instant messaging environment, CSPA communications server system 108 is configured to facilitate instant messaging between users. In a voice mail context, CSPA communications server system 108 is configured to provide voice mail services.

Communications application system 110 is identifiable to CSPA communications server system 108, and is configured to send and receive electronic communications using the services provided by CSPA communications server system 108. Communication application system 110 is shown separately from CSPA communications server system 108 solely for explanation purposes. It may form an actual part of the CSPA communications server system 108, as with some web-based CSPs, or it may be a separate client-side component identifiable to CSPA communications server system 108 over a network or the Web. In the above example of instant messaging, communication application system 110 is an instant messaging application running on central servers or client devices.

A communications channel 112, called an out-of-band or back channel, connects CSPA communications server system 108 with one or more third-party service provider systems 106 (for simplicity, only one such system is illustrated). This out-of-band channel 112 is configured to securely carry information and data between CSPA communications server system 108 and third-party service provider system 106. Out-of-band communications channels include non-anonymous channels, such as, for example, a virtual private network (VPN), a remote procedure call (RPC) channel, or other such web services or hypertext transfer protocol (HTTP) channels. Third-party service provider system 106 may be systems for any third-party service provider, such as an online retail provider, auction provider, or help or information provider. Both third-party service provider system 106 and CSPA communications server system 108 can send and receive communications over out-of-band channel 112. As shown in FIG. 1, third-party service provider system 106 also is configured to communicate with CSPB communications system 104 via CSPB communications server system 114 over channel 116. Channel 116 may be in-band channel. The in-band channel carries communications between users in contrast to the out-of-band channel, which connects third-party service provider system 106 to CSPA communications server system 108. Similar to CSPA communications server system 108, CSPB communications server system 114 is configured to facilitate communications over the Web between a subscribing CSPB user and other entities and persons. Communications application system 118, which is identifiable to CSPB communications server system 114, is configured to send and receive electronic communications using the services provided by CSPB communications server system 114. It may send such communications to communication application system 110 via CSPA communications server system 108 over in-band channel 120. Although communications application system 118 is shown separate from CSPB communications server system 114, it also may be an actual component in CSPB communications server system 114. Additionally, as indicated above, each of the connections and channels between the illustrated components and systems may occur over a network, the Internet, or the Web.

Figure 2:
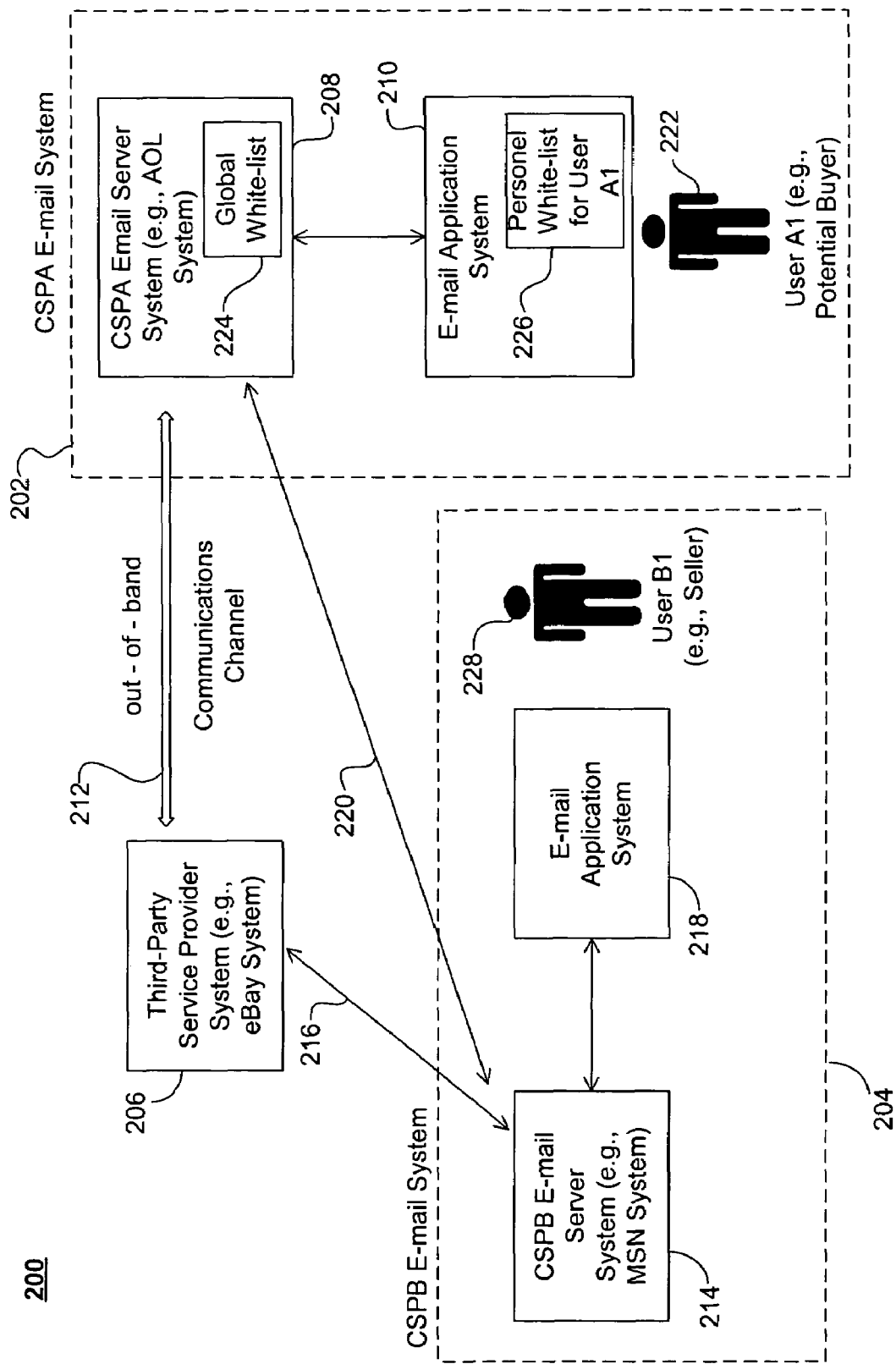
FIGS. 2, 3, and 4 are block diagrams of a transactional white-listing system using electronic mail.

FIG. 2 shows an example of a white-listing system 200 implemented in an e-mail communications environment. Such an e-mail communications environment might be, for example, an online auction website like ebay.com (see example user interface in FIG. 5). System 200 includes CSPA e-mail system 202, CSPB e-mail system 204, and third-party service provider system 206. CSPA e-mail system 202 includes CSPA e-mail server system 208 and e-mail application system 210. CSPA e-mail server system 208 is configured to facilitate e-mail between CSPA e-mail users, such as user A1 222, and other e-mail users on a network or the Web. E-mail user A1 222 sends and receives e-mails over the network or the Web using e-mail application system 210 (which is uniquely configured for user A1 222) and the various e-mail related services, such as e-mail filtering, of CSPA e-mail server system 208. In the depicted implementation, either or both of CSPA e-mail server system 208 and e-mail application system 210 filter received e-mails through white-lists to control and eliminate spam. CSPA e-mail server system 208 has global white-list 224 that filters the aggregated collections of e-mails that are received or directed to individual or multiple of the e-mail users associated with or using server system 208. Individual subscribing e-mail users also may further filter e-mails using a personal white-list specific to their identity. E-mail to user A1 222, for example, is filtered through personal white-list 226 before actually being displayed to user A1 222.

For simplicity, only one subscribing e-mail user, user A1 222, is shown; however, it is understood that CSPA e-mail server system 208 provides e-mail services for many different subscribing e-mail users. Each of these e-mail users, like user A1 222, may use a personal white-list, such as white-list 226, to further filter received e-mails sent directly to that e-mail user. Global white-list 224 and personal white-list 226 contain information and data identifying e-mail users that are approved e-mail senders. E-mail from these approved senders, which may be subscribers of CSPB or of any other CSP, is passed through to its intended recipient without being blocked by other spam filtering systems. For example, user A1 222 receives all e-mail from e-mail users that are listed in both global white-list 224 and personal white-list 226. Personal white-ist 226 may be maintained on a non-local server system or on a local device used by the user. Examples of local devices include personal digital assistants, personal computer, cellular phones, connected consumer electronics devices (e.g., video conferencing over a Web-connected television), and internet phones that handle voice-over-IP. Although not shown, it is understood that the described systems incorporate databases for storing information, such as the white-list entries. Thus, a white-list entry is added by adding information into a database; the entry in the database may include information sent by third-party service provider system 206 as well as information generated by CSPA e-mail server system 208.

The third-party service providers, who form trusted relationships with CSPA, share an out-of-band channel between their communications systems and those of CSPA. Using this out-of-band channel and the systems and methods described herein, the third-party service provider may ensure a communications path between two communications user. As depicted in FIG. 2, third-party service provider system 206 is connected to CSPA e-mail server system 208 via an out-of-band communications channel 212. Third-party service provider system 206 is configured to send communications to CSPA e-mail server system 208 over channel 212, and to receive communications from CSPA over channel 212. These communications include both data and metadata. For example, third-party service provider system 206 may use these out-of-band communications over channel 212 to notify CSPA e-mail server system 208 that user A1 222 (e.g., a potential buyer on ebay.com) is expecting an e-mail from another e-mail user, such as user B1 228 (e.g., a seller on ebay.com). This may be done even though user A1 222 does not know the actual identity of user A1 222 (see process in FIG. 9A). In response to such notification from third-party service provider system 206, CSPA e-mail server system 208 may add identifying information for user B1 228 to global white-list 224 and personal white-list 226 to ensure that user A1 222 is able to receive e-mail from user B1 228.

Third-party service provider system 206 also is configured to send e-mails to user B1 228 via CSPB e-mail server system 214 and e-mail application system 218. Thus, third-party service provider system 206 informs user B1 228 that user A1 222 is expecting an e-mail from user B1 228, and provides an e-mail address of user A1 222 to user B1 228. Third-party service provider system 206 knows the e-mail address or other information about user A1 222 based on information contained in a registration profile previously filed out by user A1 222 (such as when user A1 222 filed out an ebay.com user profile), or user A1 222 may provide his contact information at the time of indicating a desire for a response from user B1 228 (such as at the time of selecting option 506 of FIG. 5). Third-party service provider system 206 is configured further to send e-mails to user A1 222 along channel 212 or an in-band channel (not shown). In some implementations, third-party service provider system 206 is configured to send additional out-of-band communications over channel 212 informing CSPA e-mail server system 208 that user B1 228 can be removed from white-lists 224, 226. This additional communication may be sent upon completion of a transaction or upon expiration of a specified time period.

CSPB e-mail system 204 includes CSPB e-mail server system 214 and e-mail application system 218. E-mail application system 218, which is uniquely associated with user B1 228, allows user B1 228 to read received e-mails as well as draft and send outgoing e-mails. For example, it is configured so that user B1 228 can send an e-mail to user A1 222 over a standard in-band communications channel 220. That channel may be through a network, the Internet, or the Web. Although not shown, in one implementation, CSPB e-mail server system 214 has a global white-list similar to global white-list 224, and e-mail application system 218 has a personal white-list for user B1 228 similar to personal white-list 226. In such an implementation, third-party service provider system 206 may be additionally configured to send an out-of-band communication to CSPB e-mail server system 214 to white-list user A1 222. This implementation would permit user A1 222 to respond to user B1's e-mail without having the response blocked by other spam filtering processes.

Figure 3:
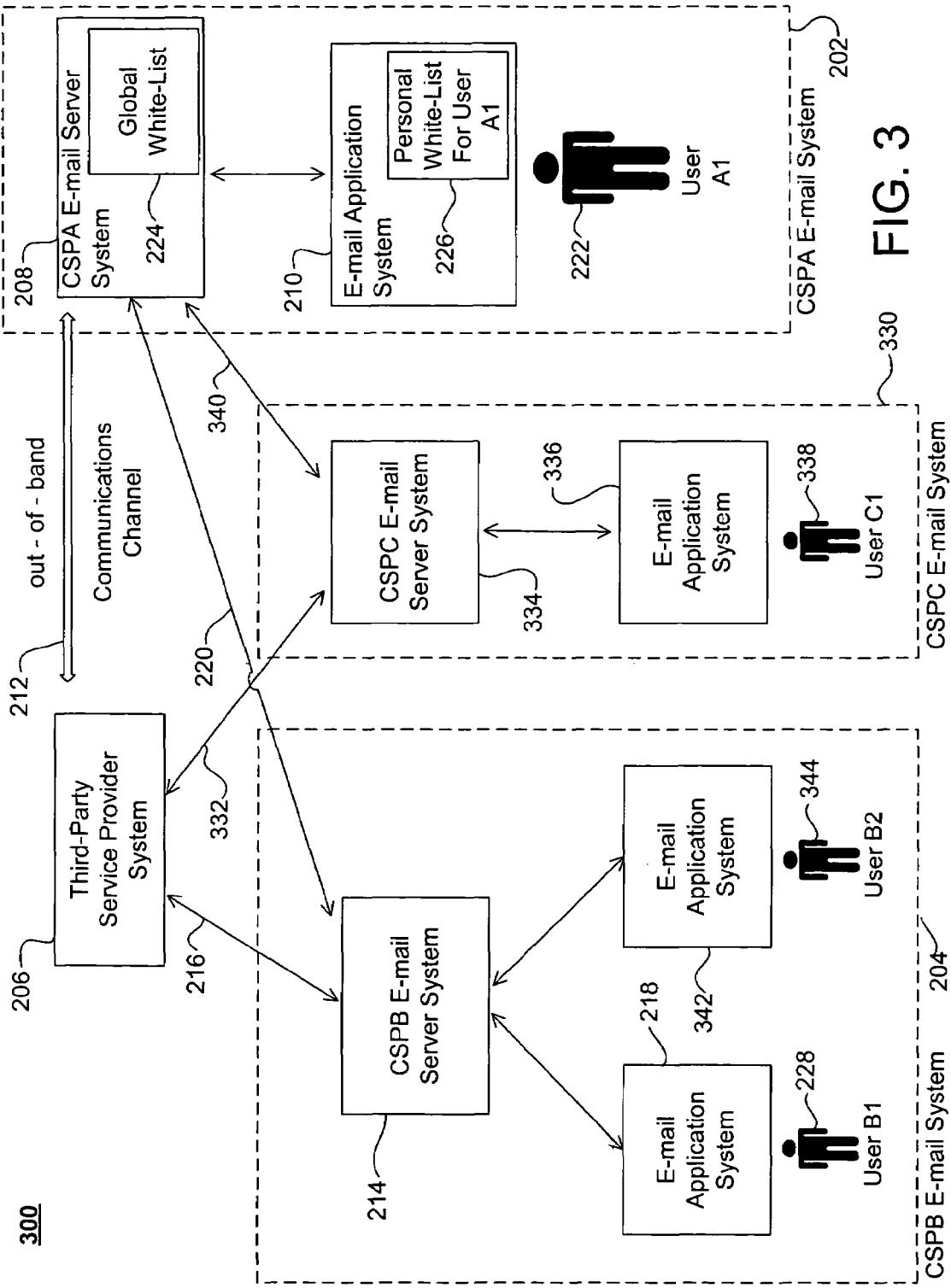

FIG. 3 illustrates that transactional white-listing system 200 of FIG. 2 may be expanded to encompass any number of CSPs and CSP users. For simplicity, the components of FIG. 3 that are described in the discussion of FIG. 2 above (i.e., those bearing numbers 202–228) are not described again now. Their same descriptions from above apply equally to FIG. 3. The illustrated system 300 of FIG. 3 may be implemented, for example, in the information request context (see sample user interface in FIGS. 6–7). In that context, user A1 222 may request information from a website on a number of different topics. To respond to each of the differing requests, third-party service provider system 206 may notify CSPA e-mail server system 208 of multiple entities that need to be white-listed in global white-list 224 and personal white-list 226. In the implementation of FIG. 3, for example, third-party service provider system 206 sends an out-of-band communication over channel 212 to CSPA e-mail server system 208 identifying each of user B1 228, user B2 344, and user C1 338 to be white-listed in lists associated with user A1 222. User A1 222 would then be able to receive e-mails from each of these white-listed users 228, 344, 338.

Based on an action by user A1 222 (such as selecting submit option 702 from FIG. 7), third-party service provider system 206 sends e-mails to each of user B1 228, user B2 344, and user C1 338 informing them that user A1 222 desires information from them. User B1 228 may then send user A1 222 information over channel 220 using e-mail application system 218 and CSPB e-mail server system 214. User B2 344 may send information to user A1 222 over channel 220 using e-mail application system 218 and CSPB e-mail server system 214, and user C1 338 may send information over channel 340 using e-mail application system 336 and CSP C e-mail server system 334. It is important to note that although each of these channels are shown and referenced as a direct and separate channel, such is done for explanation purposes only. These channels may simply be any connection over a network, the Internet, or the Web. As such, in reality, e-mails from user B1 228 and user B2 344 may not travel over the same channel.

Using the example of FIG. 7 in which user A1 222 requests information related to an upcoming move to a new city, user B1 228 may be an association of realtors, user B2 344 may be a central office for the local schools, and user C1 338 may be the local electric company. Thus, because each of these users are transactionally white-listed by system 300, user A1 222 can receive the information he needs to plan his upcoming move. Although third-party service provider system 206 may identify each user 228, 344, 338 to CSPA e-mail server system 208 in one initial out-of-band communication over channel 112, it may later send separate communications over channel 112 informing CSPA e-mail server system 208 when to remove each user from white-lists 224, 226.

Figure 4:
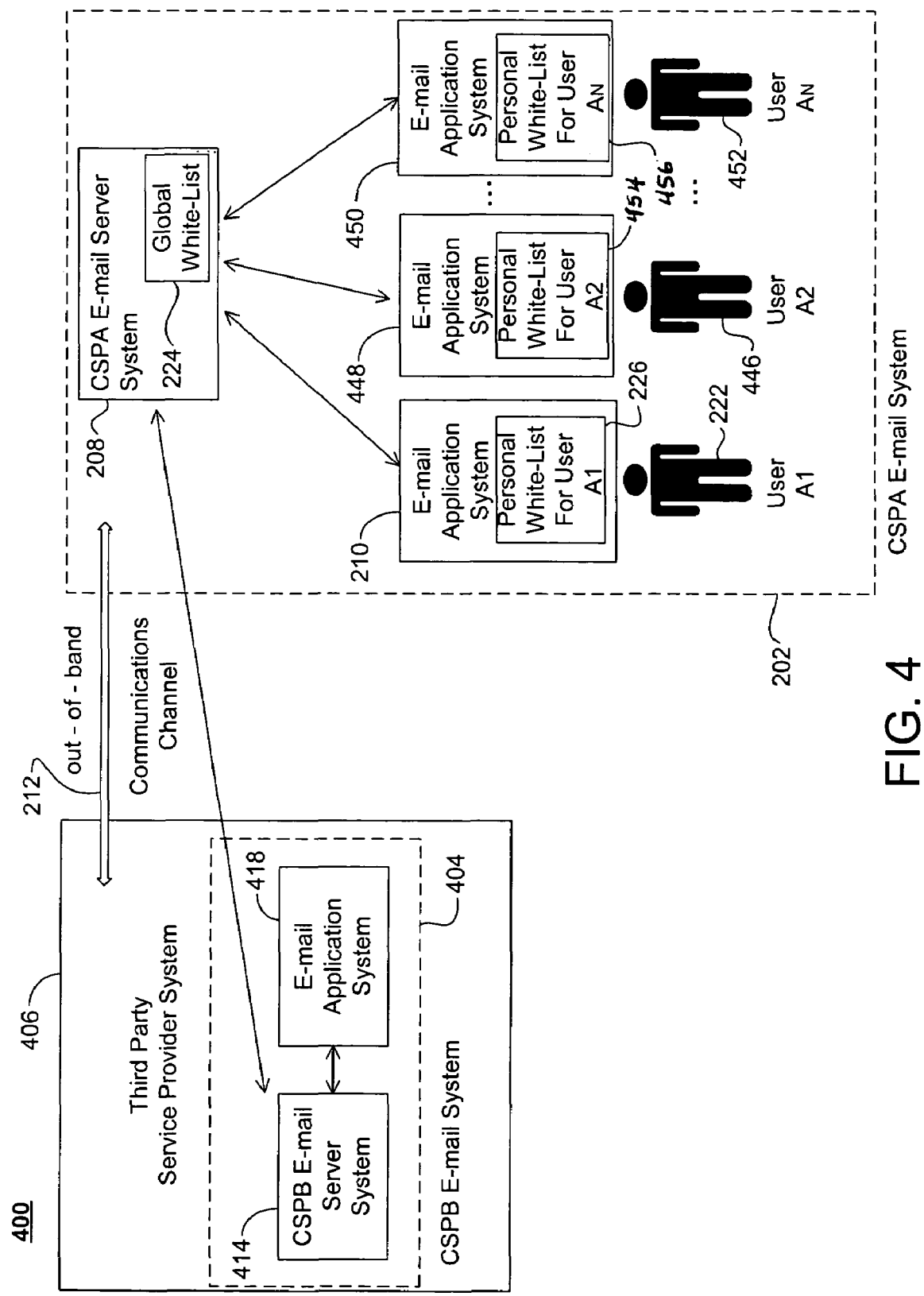

FIG. 4 illustrates an implementation in which third-party service provider system 406 itself is the entity being white-listed as a result of out-of-band communications from itself. CSPA e-mail server system 208 is configured to facilitate e-mail between multiple subscribing CSPA users (A1–An) and other e-mail users on the Web. These multiple users send and receive e-mails over the Web through their respective e-mail application systems, which are identifiable to CSPA e-mail server system 208. CSPA e-mail server system 208 has global white-list 224, and each respective e-mail application systems has its own personal white-lists associated with users A1–An, respectively. While global white-list 224 filters received e-mails for each of the multiple subscribing users A1–An, the personal white-lists further filter e-mail for only their associated user. Thus, e-mail for user A1 222 is filtered by global white-list 224 and personal white-list 226. E-mail for user A2 446, however, is filtered by global white-list 224 and personal white-list 454. As discussed with reference to FIG. 2, third-party service provider system 406 is configured to send and receive communications, including data and metadata, to CSPA e-mail server system 208 over out-of-band channel 212. As depicted, third-party service provider system 406 uses these out-of-band communications to have itself added to global white-list 224 and to the personal white-lists of multiple CSPA subscribing users in order to send e-mails to the multiple users. This provides a way for third-party service provider system 406 to transactionally provide communications to multiple intended recipients, and to later remove itself from the white-lists.

In some implementations, CSPA e-mail server system 208 checks to see whether the white-listed entity is the same as third-party service provider system 406. If the white-listed party is the same as third-party service provider system 406, CSPA e-mail server system 208 may add a metadata indicator to the white-lists indicating that some special treatment should be given to e-mails from that entity. Later, when e-mails from an entity having such an indicator is received, they may be visually distinguished or otherwise identified to receiving users as bulk or multiple party mail.

Although FIG. 4 shows CSPB e-mail system 404 located within third-party service provider system 406, this is done primarily to emphasize that third-party service provider system 406 is itself being white-listed and sending the e-mail. It is understood by those of ordinary skill, however, than CSPB e-mail system 404 may be a third-party CSP (e.g., AOL) that supplies services to third-party service provider system 406 (e.g., amazon.com). As such, CSPB e-mail system 404 may be connected to third-party service provider system 406 via an in-band and/or out-of-band communications channel over the Internet or the Web (not shown).

It should be noted that two or more of the illustrated components can be combined or modified without altering the nature of above described systems. For example, although shown for simplicity as separate components of the white-listing systems, CSPA e-mail server system 208 and e-mail application system 210 can be implemented as a single component without altering the nature of the white-listing systems. Because other components, such as databases and routers, are well-known in the art, they have not been described. It is within the knowledge of one of ordinary skill, however, to configure such systems, distribute them over a multiplicity or servers, combine the use of white-lists and other communications filters, etc.

II. Example User Interfaces

Figure 5:
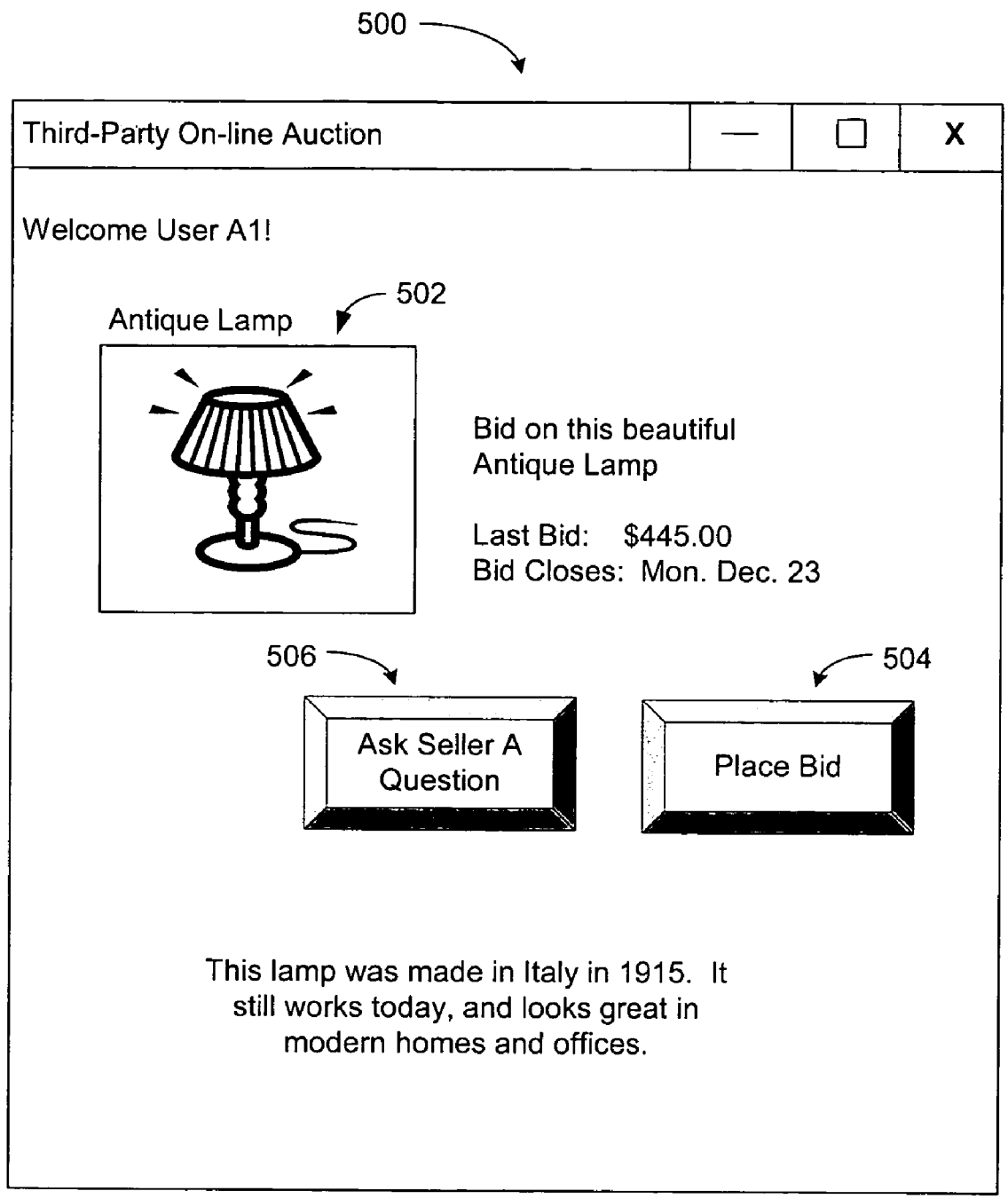

The illustrated system is better understood with reference to an example user interface shown in FIG. 5. FIG. 5 shows an example webpage 500 from third-party service provider system 206 (see FIG. 2). In this example, the third-party service provider is an online auction website, such as ebay.com. The example webpage 500 shows an antique lamp 502 for sale to the highest bidder. The webpage 500 includes a picture and a description of the lamp 502. Options are provided on webpage 500, whereby a visitor to webpage 500 may choose to place a bid on the lamp by selecting bid button 504 and/or to ask the seller a question by selecting question button 506. If the visitor (e.g., user A1 222 from FIG. 2) selects question button 506, the visitor or potential buyer may then enter the question(s) they want to ask the seller (e.g., user B1 228 from FIG. 2). Because some third-party online auctions do not disclose the contact information of the seller, however, the question submitted by the viewer and the contact information of the viewer is then forwarded to the seller by the third-party online auction system. Such a system protects the seller's contact information from open publication, and allows the seller to determine which viewers to e-mail in response to questions asked. Third-party service provider system 206 also sends an out-of-band communication to the CSP of the viewer to inform the CSP that the viewer is thereafter expecting a responsive e-mail from the seller. The out-of-band communication identifies the seller to the viewer's CSP so that the CSP can add the identifying information of the seller to any global and personal white-lists associated with the viewer. The seller may elect then to e-mail the viewer to answer his question(s), which e-mail is filtered through the white-lists and sent directly to the e-mail application system for the viewer to read. Thus, the system shown in FIG. 2 operates to ensure that the viewer is able to receive e-mail from the seller even though the viewer does not know the identify of the seller (see operational flow in FIGS. 10A–10B). Additional information, such as a transactional identifier or an expiration date, may be included in the out-of-band communication sent by third-party service provider system 206.

The trigger for the out-of-band communication additionally may be an explicit option (not shown) presented to the viewer, such as a pop-up window or other interface presented to the viewer after the viewer selects option 506. For example, this interface may ask the viewer whether he wishes to enable future communications with the seller. It can even provide options to the viewer to permit the viewer to specify and control certain parameters of the transactional white-listing. The viewer can then specify, for instance, that the seller is to be transactionally white-listed for three weeks or until the bid closes on the item the viewer is interested in buying.

Figure 6:
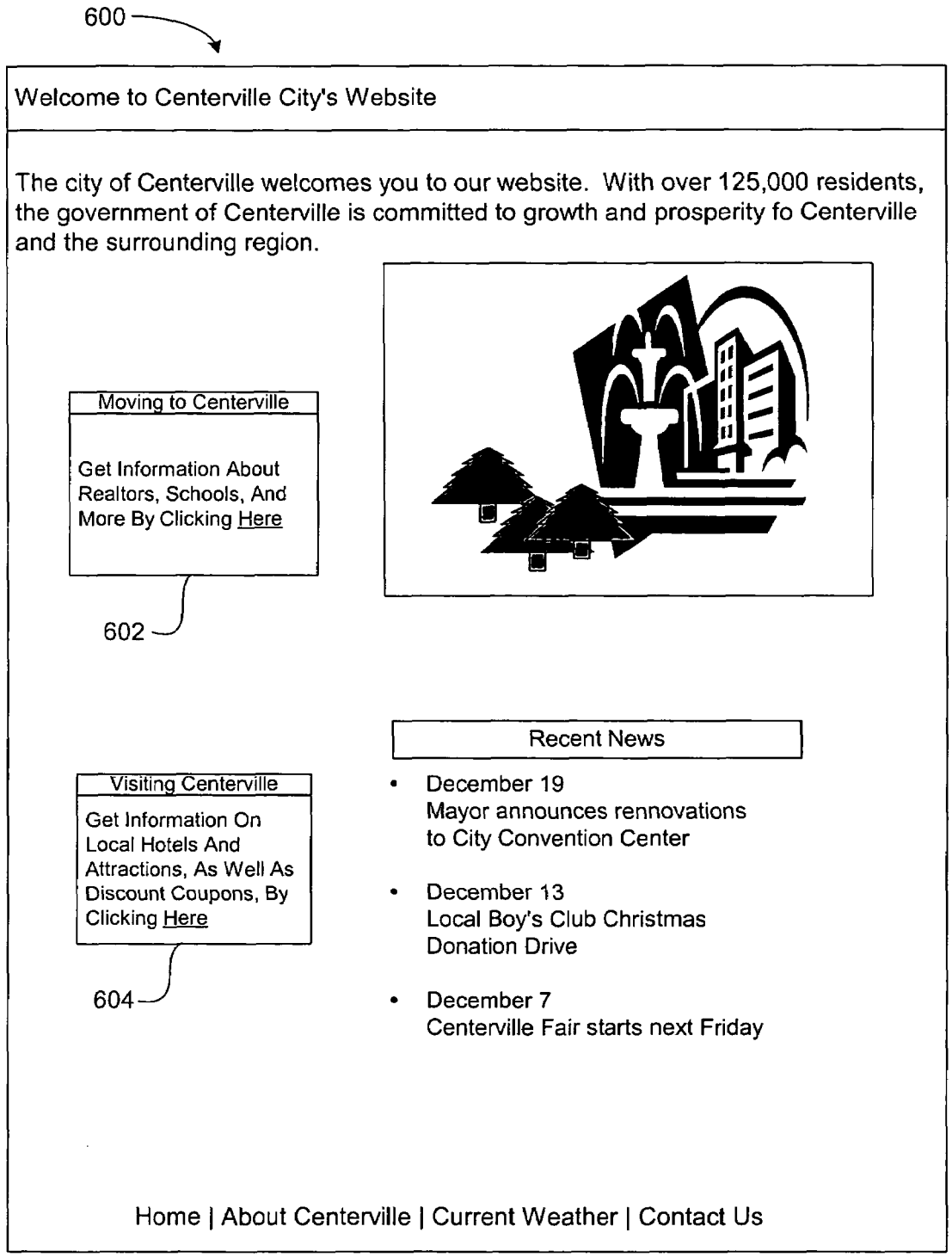

FIGS. 6–7 shows an example user interface of transactional white-listing system 300 for a webpage 600 for the city of Centerville. Webpage 600 may provide information about the city, including news updates and various options for people to request additional information. For example, webpage 600 includes options 602, 604 for viewers to receive additional information about moving to or visiting Centerville. By selecting moving option 602, the viewer (e.g., user A1 222 of FIG. 3) is presented another webpage from which he may select those items on which he wants additional information.

FIG. 7 shows an example webpage 700 listing those items for which the viewer may request additional information. From webpage 700 the viewer may select, for example, options to receive information about local reality agencies, private high schools in the area, and the local electric company. After the viewer checks those items desired and selects submit option 702, third-party service provider system 206 notifies one or more entities (e.g., users B1, B2, and C1 of FIG. 3) that the viewer wants information from them. Third-party service provider system 206 also sends an out-of-band communication to the CSP for the viewer to inform the CSP that the viewer expects e-mails from the one or more entities. Thus, the viewer may receive e-mails from local realtors, private high schools, and the electric company for the area. Once the viewer receives an e-mail from one of these entities, the disclosed systems and methods may remove or inactivate that entity so that the entity cannot send additional and unrequested e-mail or advertisements to the viewer.

Figure 8:
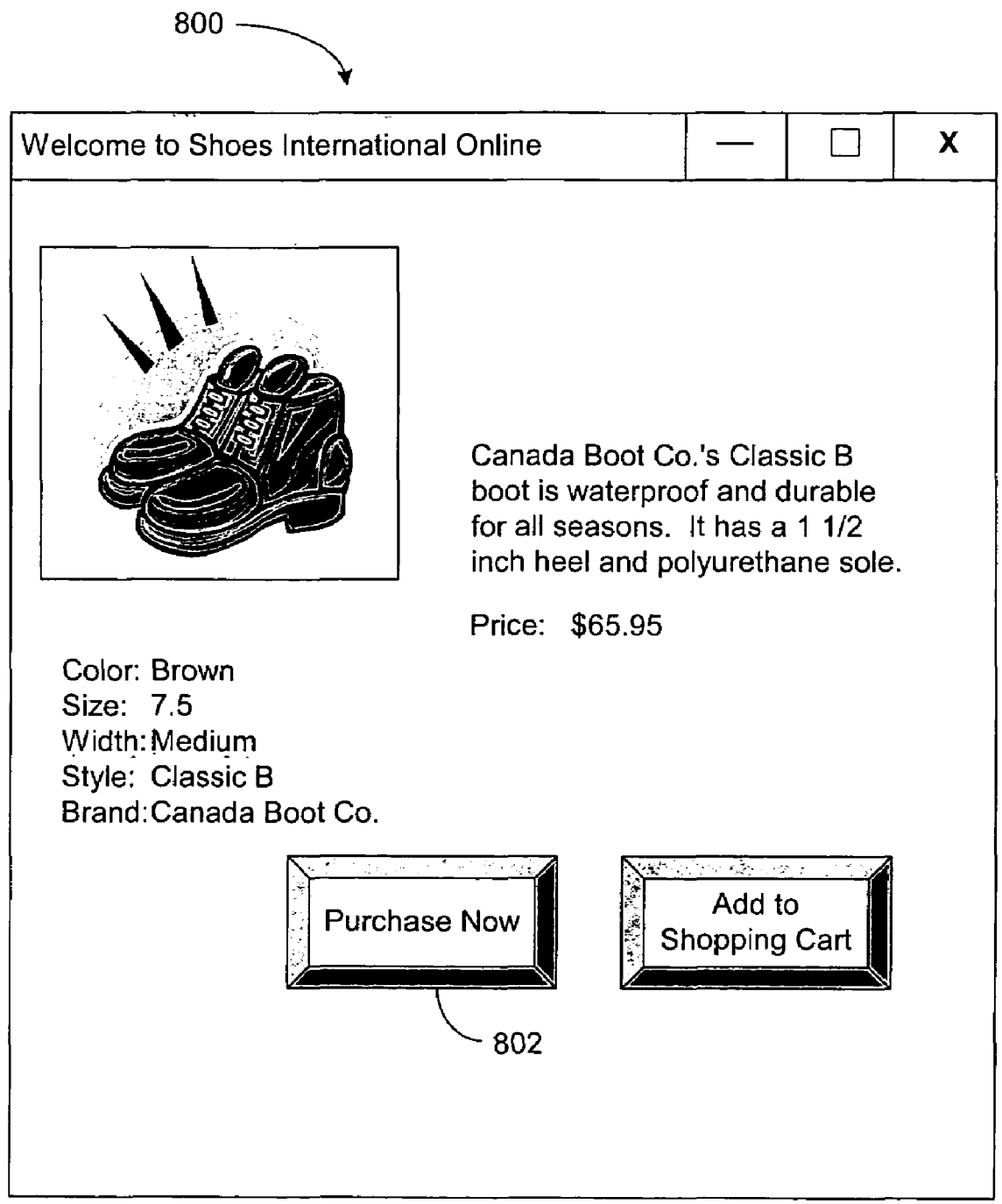

Another example user interface is shown in FIG. 8. In this interface, a viewer (e.g., user A1 222 from FIG. 2) may visit an online retail webpage 800. Webpage 800 is associated with an online third-party service provider system 206, such as amazon.com. The viewer may shop until finding an item of interest, such as a pair of boots, that the viewer wants to buy. After selecting the color and size, the viewer may select an option 802 to purchase the boots. In this context, the viewer may wish to receive e-mails containing shipping and order information from either the third-party service provider system 206 or another entity actually doing the shipping, such as Federal Express or UPS. The viewer may wish to receive such e-mails only as long as necessarily for her to receive the boots; the viewer may not wish to thereafter be inundated with commercial and advertising e-mails from the online third-party service provider system 206. Similar to the online auction context, selection of the purchase option 802 may prompt third-party service provider system 206 to send an out-of-band communication to the CSP for the viewer identifying either third-party service provider system 206 or another shipping entity. If a shipping entity other than third-party service provider system 206 is identified, system 206 notifies the shipping entity of the viewer's e-mail address so that the shipping entity knows to send shipping updates to the viewer. These approaches find practical applications in other contexts also, such as, for example, where a viewer purchases an airplane ticket. Using the disclosed systems and methods, the viewer is ensured of receiving flight updates (e.g., flight time changes or cancellations) as needed until the return date of the airplane ticket without opening the e-mail filter door to permit general unsolicited e-mail from the airline or travel website.

III. Methods

Figure 9A:
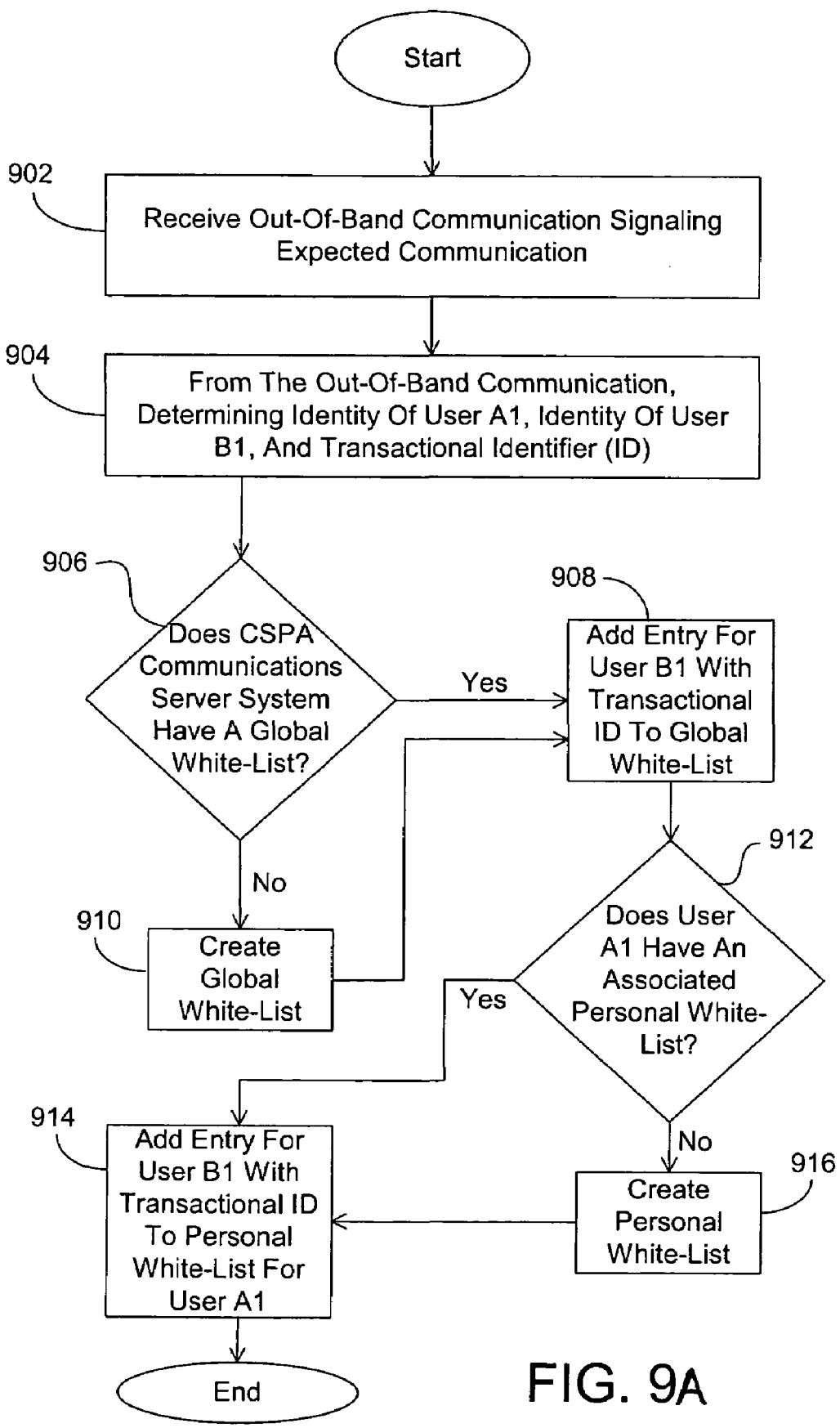
FIG. 9A is a flow chart illustrating a method employed by a transactional white-listing system to add entries to white-lists.

One method of using the described white-listing systems to add a user to global and personal white-lists is described in further with reference to FIG. 9A. For convenience, particular components described with respect to FIGS. 1–4 are referenced when describing the process of FIG. 9A. Similar methodologies, however, may be applied in other implementations where different components are used to define the structure of the system, or where the functionality is distributed differently among the components shown in FIGS. 1–4. The method of FIG. 9A will be described in the context of an e-mail system; however, as stated above, this process may be implemented in other systems (e.g., IM systems, message boards, caller ID systems).

In the illustrated method, CSPA e-mail server system 208 receives an out-of-band communication from third-party service provider system 206 indicating that user A1 222 anticipates receiving an e-mail from another e-mail user such as, for example, user B1 228 (902). The out-of-band communication often is triggered by an action of user A1 222 indicating the desire to receive an e-mail from another e-mail user. This trigger may result from direct or indirect action by user A1 222.

As discussed with reference to FIG. 2, the trigger may be user A1 222 selecting an option 506 to ask user B1 228 a question about an item for sale on online auction website 500 (see FIG. 5). The trigger also may be the purchase of the item via a checkout procedure (e.g., ebay.com checkout). The trigger also may be initiated by user A1 222 visiting information request webpage 700 and submitting a request for additional information via submit option 702 (see FIG. 6). Other triggers initiated by user A1 222 may be online purchases, such as purchasing an airline ticket or buying a pair of shoes (see FIG. 8). The trigger may be initiated by user A1 222 filling out a survey and expressing a willingness to participate further in the survey or by user A1 222 seeking assistance or help from a help or vendor website, or otherwise interacting with the website. Another example in the help website context occurs when user A1 222, after recently buying a new computer, visits the computer manufacturer's webpage to ask for help on a particular problem encountered with the new computer. The trigger may be explicit by presenting a selectable option to allow user A1 222 to specifically request that an entity be white-listed. These are all examples of a user taking direct actions to initiate the trigger.

In other contexts, indirect user action may initiate the trigger. An example of indirect user action may involve a context where user A1 222 has an established user profile that permits a third-party service provider to transactionally white-list itself whenever certain events occur. For example, user A1 222 may have a Federal Express account configured to white-list Federal Express's system each time user A1 222 mails a package under his Federal Express account. The account profile may include contact information, such as an e-mail address, for sending the user A1 222 shipping receipts and updates. Advanced options in the account profile may allow user A1 222 to specify an end trigger whereby the third-party service provider system (e.g., Federal Express's system) is removed or inactivated from the white-lists associated with user A1 222 (see discussion of FIG. 11). Examples of such end triggers include receipt of the package at its destination or the expiration of a set time period. Other examples of account profiles as a part of the present systems and methods include profiles with online retailers or other service providers that indicate the user is willing to receive sales and advertising communications at certain times of the year (e.g., around Christmas or other holidays) or for certain items or events (e.g., sales on classical music or discounts on local sporting events). An indirect trigger in the online auction context might be winning the bid on an item. In some implementations, however, the trigger may be initiated without and independent of any user action. In these implementations, a trusted third-party service provider system may trigger transactional white-listing for unsolicited communications from itself to members of a particular CSP.

Returning to the process of FIG. 9A, after CSPA e-mail server system 208 receives the out-of-band communication sent over channel 112 (902), CSPA e-mail server system 208 reviews the communication to determine information identifying user A1 222 (the intended recipient), information identifying user B1 228 (the expected sender), and a unique transactional identifier (904). The information identifying user B1 228 in the out-of-band communication may be any information capable of identifying communications from user B1 228, such as, for example, an e-mail address, a domain name, a dedicated, static internet protocol (IP) address, a media access control (MAC) address, or any combination thereof. The information identifying user A1 222 in the out-of-band communication may be any information capable of identifying user A1 222, such as, for example, an e-mail address, a domain name, a dedicated, static IP address, a MAC address, or any combination thereof. The unique transactional identifier (ID) serves to identify the entry to be added to the white-list as a transactional entry. It may be a randomly generated code, or it may be composed of a combination of data or information. For example, the unique transactional identifier may be composed of a combination of data or information identifying third-party service provider system 206 (e.g., a third-party service provider identifier or name), information identifying user A1 222 and user B1 228, the time/date of the out-of-band communication, and/or a randomly generated code. Other alternative means of generating a unique transactional identifier also may be used.

Some implementations may use a generic transactional ID rather than a unique transactional ID. In such implementations, the transactional ID may serve simply to denote the white-list entry as transactional in nature and may be the same ID for all such white-list entries. In addition to the unique and generic transactional IDs, the transactional ID may be one of a subset of defined transactional IDs. Further, all users or entities transactionally white-listed by one third-party service provider system may be given one code while all users or entities transactionally white-listed by a different third-party service provider system may be given a second, different code.

Depending on implementation, the out-of-band communication also may include additional information, such as an expiration date (e.g., expires on December 26), timeout duration (e.g., expires in two weeks), or a specified threshold number of received e-mails (e.g., expires after receiving set number of e-mails from user B1 228). This information can be used to automatically set an end trigger, whereby the transactionally white-listed user is removed from white-lists 224, 226. For example, if the out-of-band communication specifies a timeout duration of two weeks, CSPA e-mail server system 208 can automatically delete or inactivate the transactional white-list entry upon expiration of the two week period. This may be accomplished, for instance, by CSPA e-mail server system 208 calculating an expiration date based on the specified two week duration and the date of the out-of-band communication. In this example, system 208 may add the calculated expiration date to the transactional white-list entry for user B1 228 in white-lists 224, 226. Subsequent routines periodically may scan the white-lists 224, 226 for expired entries and then delete or inactivate them. System 208 alternatively may not delete or inactive the transactional entry until the next time it receives an e-mail from user B1 228. In such an implementation, system 208 deletes or inactivates the entry upon receipt of an e-mail beyond the expiration date, and handles the received e-mail without regard to the fact that user B1 228 previously was transactionally white-listed. In other examples, the out-of-band communication may indicate that the end trigger should be effected by a subsequent communication (e.g., another out-of-band communication) from third-party service provider system 206.

In addition to the end trigger information, the out-of-band communication may include other information. For instance, the communication may include a "type" indicator specifying a certain enumerated type of communications to be received. That "type" indicator may then be used to provide some special treatment to e-mails (e.g., visually distinguishing them, setting a flag to enable receipt of large attachments) received from that white-listed user. The out-of-band communication may include further information such as a date/time stamp or information identifying the particular third-party service provider system 206 who sent the out-of-band communication.

Although the illustrated method of FIG. 9A depicts the out-of-band communication as including information on the identity of user A1 222 and user B1 228 as well as a transactional ID, in some implementations the transactional ID may be generated by CSPA e-mail server system 208 instead of being sent with the out-of-band communication. The system 208 generated transactional ID may be generated in similar manner as those discussed for third-party service provider system 206 above. Whether the end event trigger is initiated by the third-party service provider or by CSPA, CSPA e-mail server system 208 may run a program periodically to identity to search and remove all expired or old transactional white-list entries.

After determining the identity of user A1 222 and user B1 228 as well as the transactional ID (904), CSPA e-mail server system 208 determines whether it has a global white-list (906). This may be determined by, for example, querying a CSPA e-mail server system 208 database (not shown). If CSPA e-mail server system 208 has global white-list 224, CSPA e-mail server system 208 adds an entry for user B1 228 to global white-list 224 (908). The entry added to global white-list 224 includes information capable of uniquely identifying user B1 228. Depending on the implementation of global white-list 224, that information may include the e-mail address of user B1 228, the name of user B1 228, a domain name associated with user B1 228, or a static IP address associated with user B1 228, a date/time stamp, and/or an identifier of third-party service provider system 206. In the depicted implementation, a unique transactional identifier also is added to the entry when created. Also, other information capable of uniquely identifying user B1 228 as the sender of the e-mail received by CSPA e-mail server system 208 may be added. If user A1 222 does not have an associated global white-list, CSPA e-mail server system 208 may create global white-list 224 (910) and then adds an entry for user B1 228 to newly created global white-list 224 along with the transactional identifier (908). The newly created global white-list 224 is stored in a database (not shown) identifiable to CSPA e-mail server system 208 so that it may be referenced in the future.

In some implementations, such as the illustrated one, an entry for user B1 228 is added to global white-list 224 with the transactional identifier regardless of whether another entry for user B1 228 already appears in global white-list 224. This may result in duplicate entries in global white-list 224 if user B1 228 already is listed in global white-list 224 as a non-transactional (e.g., permanent) entry. In such a case, user B1 228 may have a transactional entry and a non-transactional entry in global white-list 224. Such methods save processing time by permitting the addition of the transactional entry without first checking global white-list 224 to determine whether user B1 228 already exists as a permanent entry. In other implementations, the method may first check global white-list 224 to determine whether user B1 228 is already a permanent entry in global white-list 224. If it determines that user B1 228 is already listed as a permanent entry, the method may end without adding a transactional entry for user B1 228. This implementation saves storage space by preventing the addition of transactional entries for users already permanently white-listed in global white-list 224.

Next, CSPA e-mail server system 208 determines whether user A1 222 has an associated personal white-list 226 (912). This may be determined by, for example, checking memory or querying a database containing information specific to user A1 222. If user A1 222 has an associated personal white-list 226, CSPA e-mail server system 208 adds an entry for user B1 228 to personal white-list 226 (914). Otherwise, CSPA e-mail server system 208 may create personal white-list 226 for user A1 222 (916), and then adds an entry for user B1 228 to the newly created personal white-list 226 (914). As shown, a unique transactional identifier is added to the entry when created (914). The newly created personal white-list 226 is stored for future reference. The creation of both global white-list 224 and personal white-list 226 ensures that e-mail from user B1 228 is not blocked by other spam filters operating at the CSP filtering level or at the individual user level. Alternatively, the process may be implemented to add entries only to existing global and personal white-lists and not to create non-existing white-lists.

In some implementations (not shown), CSPA e-mail server system 208 further determines whether a global or personal black-list is used to filter e-mail sent to user A1 222. If a global or personal black-list is found, CSPA e-mail server system 208 checks the black-list(s) to determine whether information identifying user B1 228 appears in the black-list(s). If it does, CSPA e-mail server system 208 temporarily deletes or renders inactive the black-list entry for user B1 228. The transactional identifier may be used to temporarily disregard or inactivate the entry for user B1 228. This process is performed for any global and any personal black-list associated with user A1 222. The inactivating of the black-list entry for user B1 228 may amount to creating an exception specifically for user B1 228. For example, if a global black-list blocks all e-mail from a domain, such as bar.com, the transactional methods may create an exception for one specific user of that domain, such as foo@bar.com. The process alternatively or additionally may inform user A1 222 that user B1 228 was listed on global or personal black-lists. If informing user A1 222 that user B1 228 was black-listed, the process gives user A1 222 an option to prevent the white-listing of user B1 228.

By virtue of either having the transactional white-list entries override other spam filtering systems or making specific exceptions to black-lists and other spam filtering systems (e.g., rule based systems), the FIG. 9A process can be implemented to ensure that e-mail anticipated by user A1 222 is received by user A1 222. For example, if user A1 222 has a rule that specifies that e-mails without subjects is spam, the transactional white-list process may create an exceptions to the "no subject is spam" rule for an e-mail from foo@bar.com.

Although not shown, the process of FIG. 9A additionally may first check to determine whether user B1 228 already appears in global white-list 224 and personal white-list 226 before adding an entry from user B1 228. In such implementations, if user B1 228 is found in white-lists 224, 226, no new entry is added for user B1 228. This prevents duplicate entries for user B1 228 in white-lists 224, 226.

In implementations such as those associated with the system described in FIG. 4, it may be advantageous to use the out-of-band communications channel 212 to configure CSPA e-mail server system 208 to receive large attachments in the e-mail or to receive certain types of attachments (such as .exe files). Thus, third-party service provider system 206 may send certain information or requests over channel 212 to effect an opening in a firewall connected to CSPA e-mail server system 208 and thus to permit such attachments.

The process of FIG. 9A may be applied in host-based or client-based e-mail systems. In client-based e-mail systems (e.g., Microsoft Outlook, AOL Communicator) using client-side filtering, the e-mail application system resides on the user's home computer or other personal device. In one implementation, the client-side application system checks e-mail filtering rules with the mail server upon connection to the mail server. The rules changes may be communicated over a back-channel using either a push or pull command. Thus, upon connection to a mail server system or after lapse of a specified interval, either the client can request the changes from the server system, or the server system can independently transmit the changes to the client application system. This may be performed using any mail protocol, such as Internet Message Access Protocol (IMAP), Post Office Protocol (POP), or a proprietary protocol. A signature can be applied by the IMAP or POP mail server system that is used by the client-side application system to verify that their host IMAP or POP system is in fact the sender of the rule changes. The additions and deletions to a personal white-list thus are communicated to the client system for client-side filtering. In other implementations, the client-side specified rules are communicated to the server system for filtering of the client-specified rules and other filtering rules (such as the transactional listing of the present methods) on the server system. In such a system the client application system gives deference to the server system filtering.

The order of certain events described above can be rearranged without altering the overall nature of the FIG. 9A process. For example, although the described process adds an entry for user B1 228 (908) to global white-list 224 before adding it to personal white-list 226 (914), such an order could be easily reversed. Similarly, the order of checking a black-list and removing/inactivating a black-list entry could be performed before or after CSPA e-mail server system 208 checks the white-lists. It should also be noted that multiple instances of the process of FIG. 9A could run in parallel.

Figure 9B:
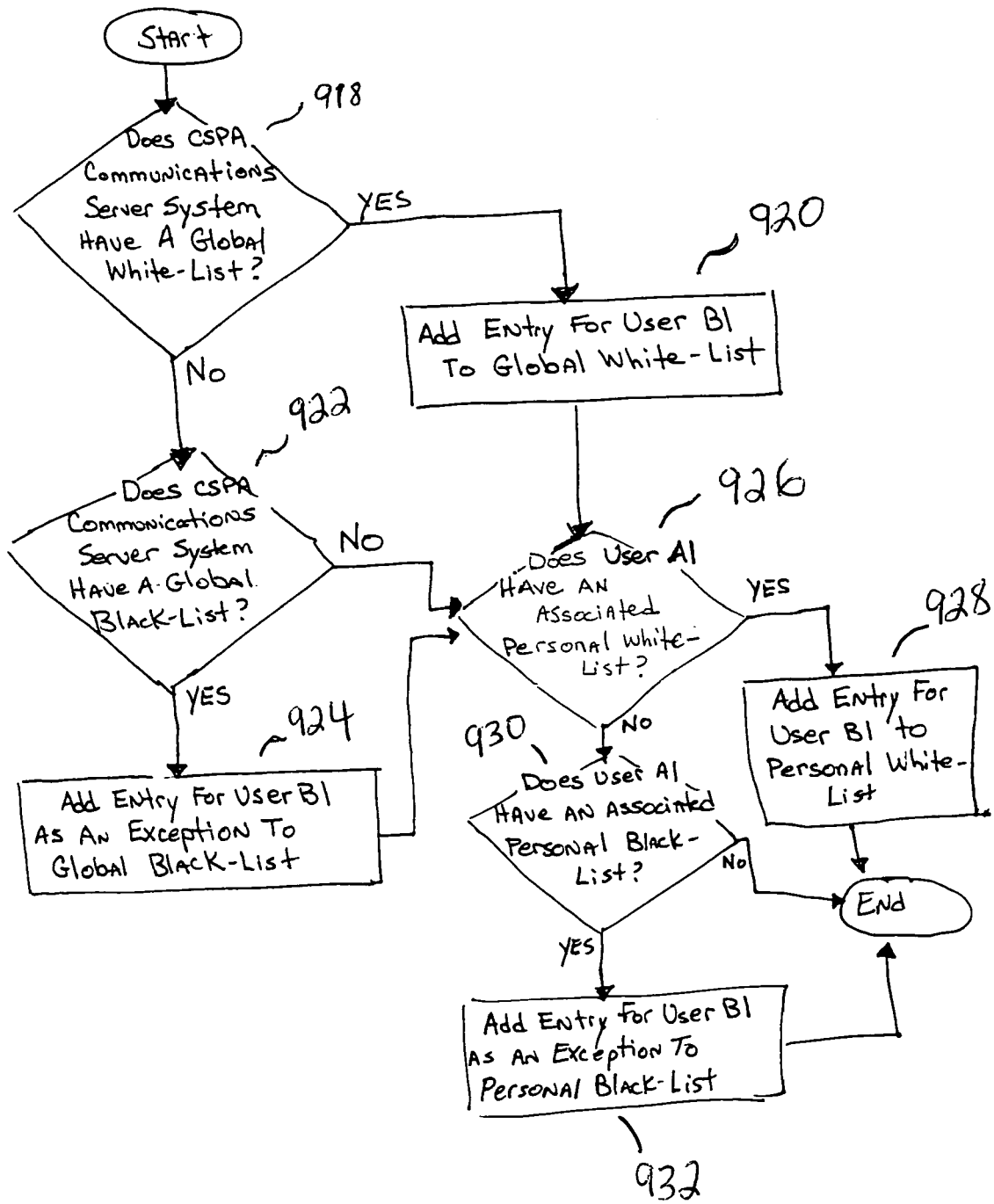
FIG. 9B is a flow chart illustrating a method employed by a transactional white-listing system to add entries to white-lists.
Figure 10A:
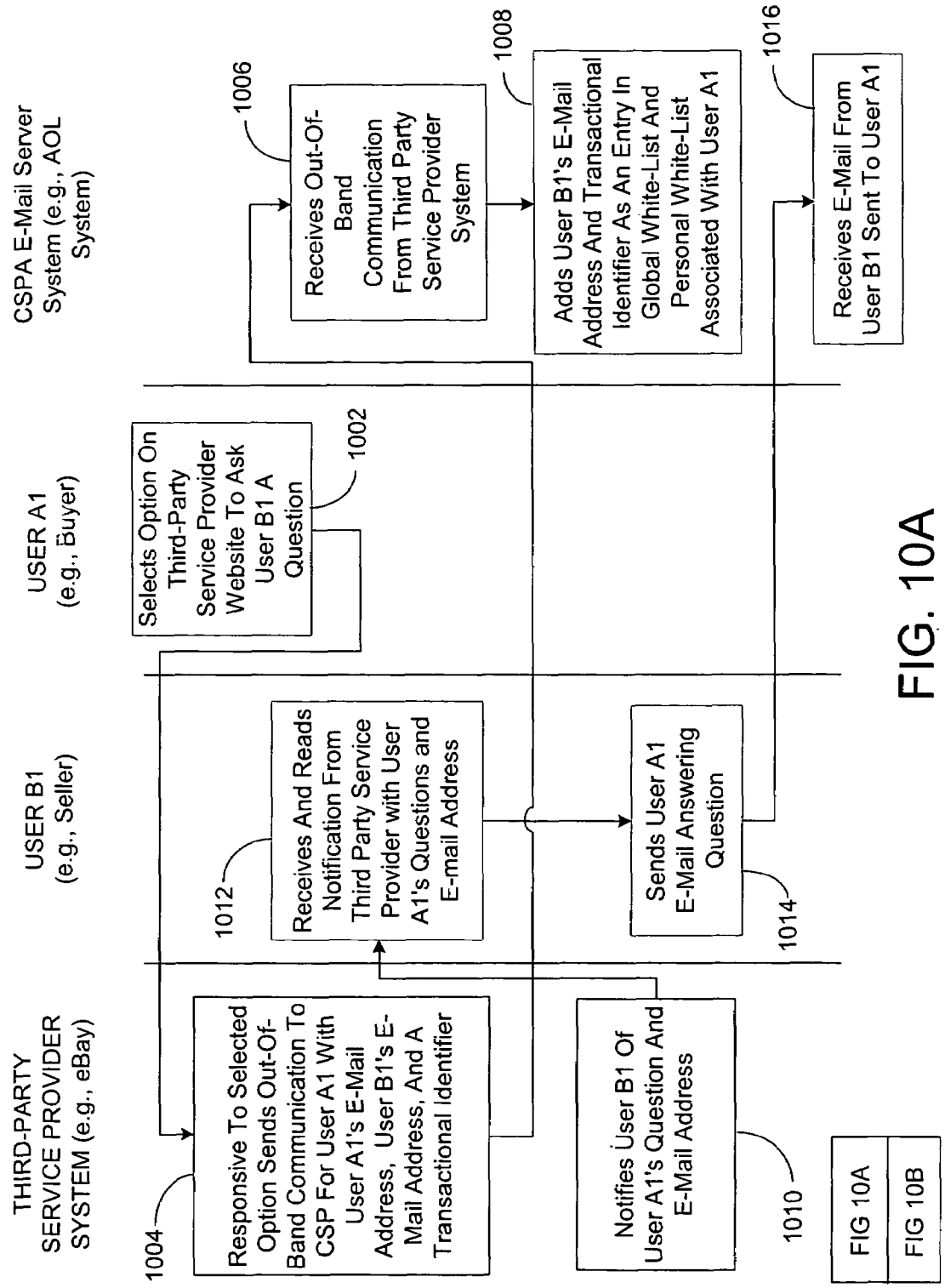
FIGS. 10A and 10B comprise an operational flow diagram illustrating an example operation of the methods and systems described in FIGS. 1–4 and 9.
Figure 10B:
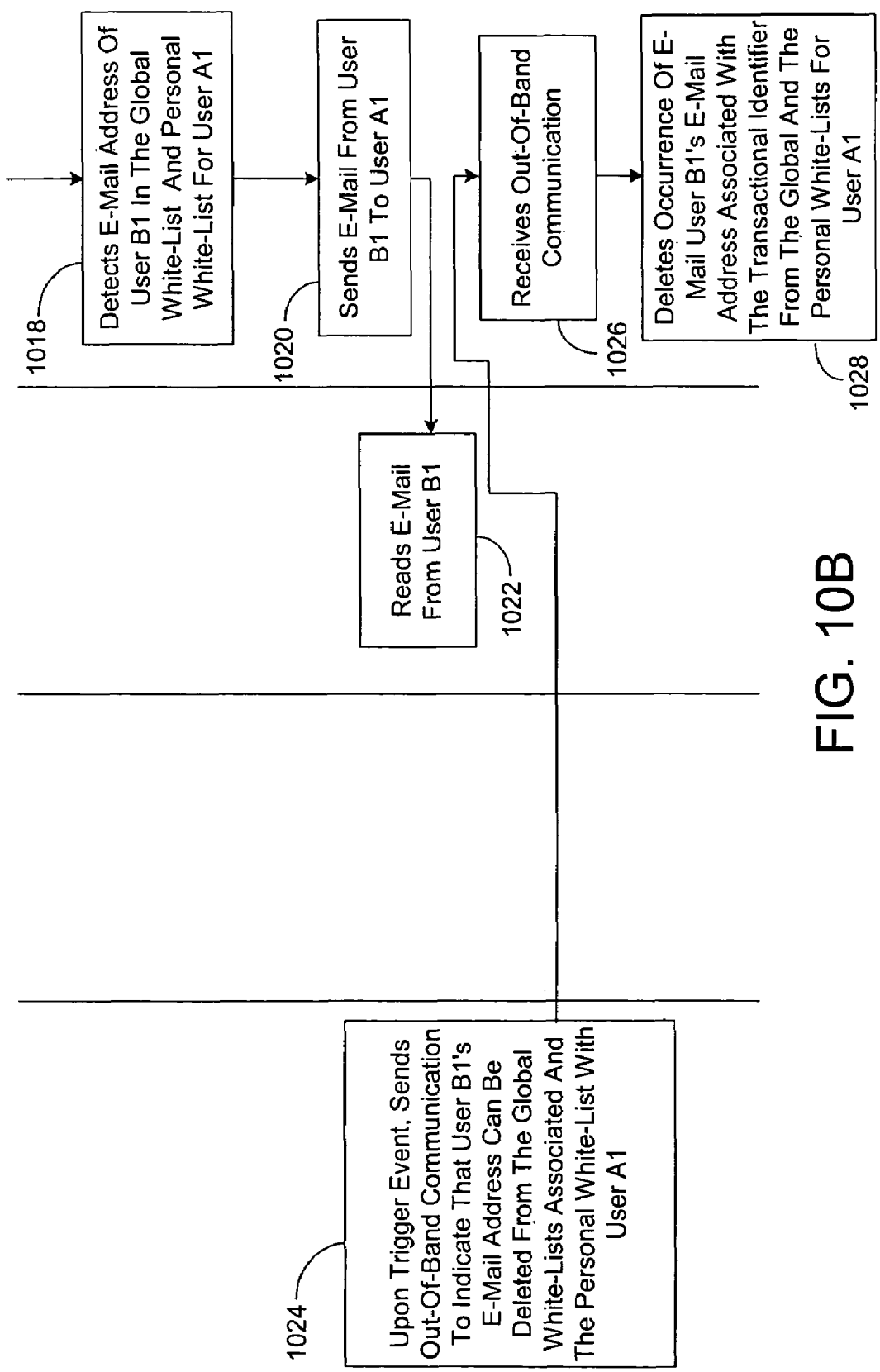

FIG. 9B illustrates another method of using the described white-listing systems to facilitate transactional communications between two users. The process of FIG. 9B is an additional or alternate implementation for steps 906–916 illustrated in FIG. 9A. Thus, after receiving an out-of-band communication and determining the identity of user A1 222 and user B1 228 (904 in FIG. 9A), the FIG. 9B process determines whether CSPA communications server system (e.g., CSPA e-mail server system 208) has a global white-list (918). This may be determined in the same manner as described with reference to step 906 in FIG. 9A above. If a global white-list exists, an entry for user B1 228 is added to the global white-list (920). Otherwise, the process determines whether CSPA communications server system has a global black-list (922). If a global black-list exists, an entry for user B1 228 is added as an exception to the global black-list (924). This exception prevents the black-list from blocking communications from user B1 228. After adding the exception (924) or upon determining that there is no global black-list (922), the process next determines whether user A1 222 has an associated personal white-list (926). If user A1 222 has an associated personal white-list, an entry is added for user B1 228 to the personal white-list of user A1 222 (928). Otherwise, the process determines whether user A1 222 has an associated personal black-list (930). If user A1 222 has a personal black-list, an entry for user B1 228 is added as an exception to the personal black-list of user A1 222 (932). After adding the entry as an exception to the personal black-list or if no personal black-list exists, the process ends. FIGS. 10A–10B illustrate the flow operation of transactional white-listing system 200 in the context of third-party service provider system 206 and CSPA e-mail system 202 shown in FIG. 2.

It is understood that one or more of the decision steps shown in FIG. 9B (e.g., 918, 922, 926, or 930) may be omitted (e.g., to save processing time or when it is known that the condition exists). Additionally, the order of the decision steps may be altered and/or some step may be deleted. For example, the process may check for an associated personal white-list (926) and an associated personal black-list (930) before checking for a global white-list (918) or a global black-list (922). The process also may omit step 918, 920, 926, and/or 928 so that the process adds exceptions to black-lists without checking for white-lists.

FIGS. 10A–10B illustrate the operational flow of system 200 with the first depicted event starting at the top of FIG. 10A. The flow operation begins with user A1 222 selecting an option on a website associated with third-party service provider system 206 to ask user B1 228 a question (1002). At this stage, user A1 222 may not know the actual identity or contact information of user B1 228. In response, third-party service provider system 206 sends an out-of-band communication to CSPA e-mail server system 208, which it knows is associated with user A1 222 (1004). That out-of-band communication includes an indicator telling CSPA e-mail server system 208 to white-list a particular user or entity (user B1 228) along with information identifying the particular user and the intended recipient (user A1 222). The information identifying users A1 222 and B1 228 may be the e-mail address of each user or other uniquely identifying information that can be used in a white-list (1004). The communication further includes a transactional identifier for use in identifying that specific white-listing transaction (1004). CSPA e-mail server system 208 associated with user A1 222 receives the communication from third-party service provider system 206 (1006), and adds the e-mail address of user B1 228 and the received transactional identifier to global and personal white-lists 224, 226 associated with user A1 222 (1008).

Third-party service provider system 206 also notifies user B1 228 of user A1's 222 question and e-mail address (1010), which notification is received by CSPB e-mail server system 214 (not shown in FIG. 10A) and passed to e-mail application system 218 (not shown in FIG. 10A) to be read by user B1 228 (1012). User B1 228 may then opt to e-mail user A1 222 an answer to his question(s) or request(s) (1014). That e-mail is drafted by user B1 228 using e-mail application system 218 and then passed to CSPB e-mail server system 214 for transmission to user A1 222 via CSPA e-mail server system 208. Next, CSPA e-mail server system 208 receives the e-mail from user B1 228 directed to user A1 222 (1016).

As shown in FIG. 10B, CSPA e-mail server system 208 checks for user B1's 228 e-mail address in global and personal white-lists 224, 226 associated with user A1 222 (1018). Because CSPA e-mail server system 208 previously added the e-mail address for user B1 228 to both white-lists, CSPA e-mail server system 208 finds user B1's information in white-lists 224, 226 and passes the e-mail from user B1 228 to user A1 222 (1020), who is then able to read the expected e-mail from user B1 228 using e-mail application system 210 (not shown in FIG. 10B) (1022).

At that or some later time, upon occurrence of an end trigger event (such as receipt of the message from user 228), third-party service provider 206 sends another out-of-band communication to CSPA e-mail server system 208 indicating that system 208 can delete or otherwise inactivate user B1's 228 information as it is associated with user A1 222 and the earlier specified transactional identifier from white-lists 224, 226 (1024). CSPA e-mail server system 208 receives that communication (1026) and deletes the occurrence of user B1's 228 e-mail address associated with the transactional identifier from white-lists 224, 226 associated with user A1 222 (1028).

Figure 11:
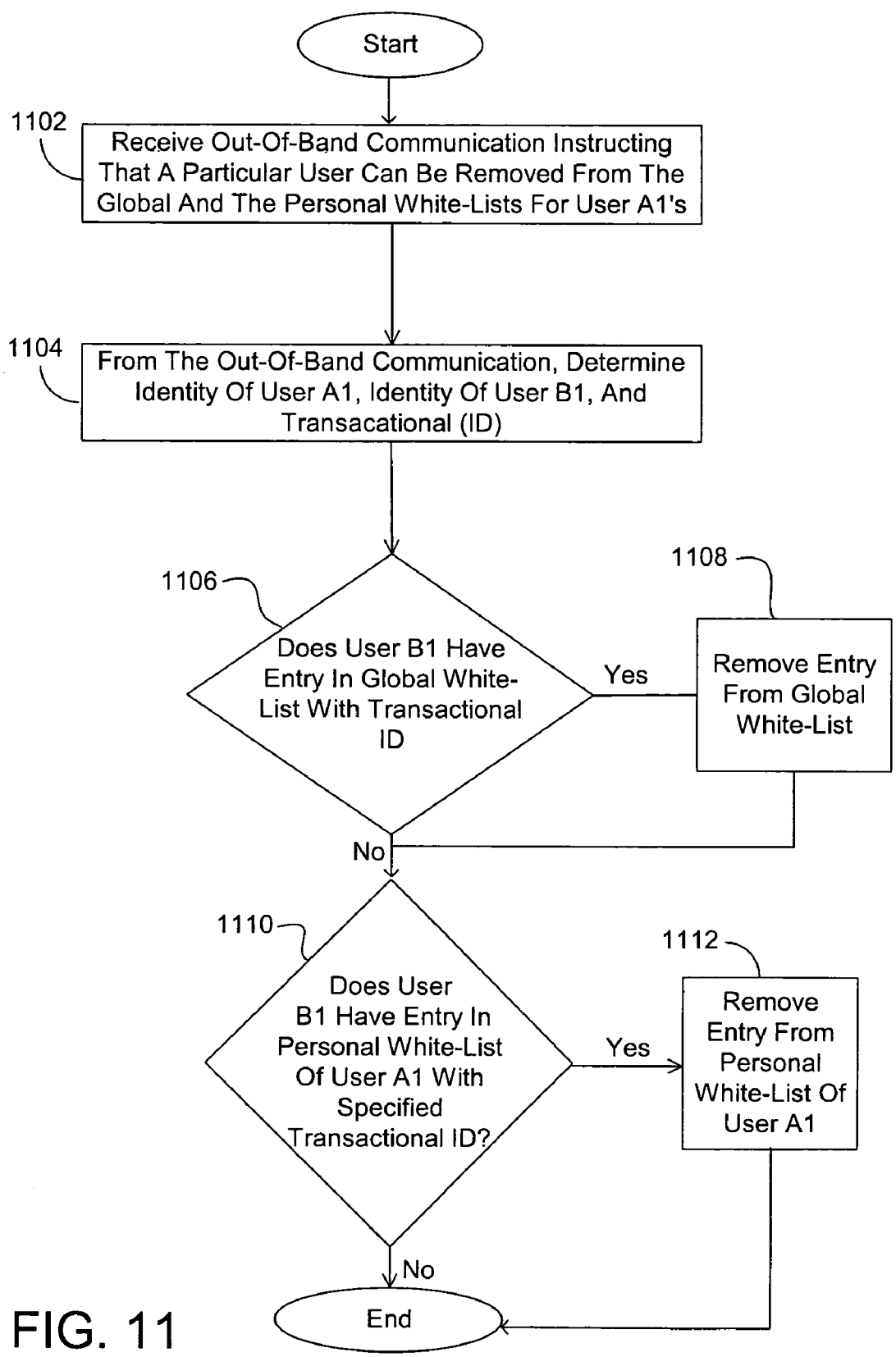
FIG. 11 is a flow chart illustrating a method employed by a transactional white-listing system to remove entries previously added to the white-lists by the transactional white-listing system.

One method employed by the transactional white-listing system to remove entries previously added to global white-list 224 and personal white-list 226 is shown in FIG. 11. In the illustrated method, CSPA e-mail server system 208 receives an out-of-band communication indicating that a particular user, such as user B1 228, can be removed or rendered inactive in white-lists 224, 226 associated with the prior intended recipient, user A1 222 (1102). As discussed with respect to FIG. 9A, this communication may be triggered by a number of different trigger events. Examples of such "end transaction" trigger events include the expiration of a specified time (which time may be specified by user A1 222, third-party service provider system 206, or CSPA e-mail server system 208) or the occurrence of a specified condition, such as the receipt of the expected e-mail. Further, such triggers may be specified by user A1 222 in an associate profile. For example, user A1 222 may specify that all transactionally white-listed users remained white-listed until user A1 222 cancels his membership with the third-party service provider system 206 that initially white-listed the various users. Upon cancellation of his membership, third-party service provider system 206 notifies CSPA e-mail server system 208 to remove all transactional white-listings having such a membership-tied end trigger.

In some implementations, the trigger event may be provided by CSPA e-mail server system 208 rather than by third-party service provider system 206. One example of this is when CSPA e-mail server system 208 removes or inactivates an entry for a white-listed user B1 228 upon receipt of an e-mail from user B1 228, upon expiration of a set duration, or upon receipt of a set number of threshold e-mails from user B1 228, e.g., without a communication from a third-party service provider system 206. The threshold may be a single e-mail such that CSPA e-mail server system 208 removes the white-listed user after receiving one e-mail from that user. In such implementations, there may be no out-of-band communications needed to trigger the removal or inactivation of user B1 228 from the white-lists. Rather, CSPA e-mail server system 208 identifies a received e-mail, checks white-lists 224, 226 to determine whether the sending user of the e-mail is transactionally white-listed, and if so, increments a counter and compares the incremented counter to the threshold number to determine whether to remove the sending user. Where the trigger is set by CSPA e-mail server system 208 to be expiration of a set duration, system 208 may run a separate routine to determine when the duration is expired. That routine may run, for example, once a day to remove expired entries appearing in white-lists 224, 226.

Returning to the process of FIG. 11, CSPA e-mail server system 208 determines from the received out-of-band communications information identifying user A1 222 and user B1 228 as well as the transactional identifier used to previously add user B1 228 to white-lists 224,226 (1104). The identifying information is the same type of information discussed with reference to FIG. 9A above. CSPA e-mail server system 208 then determines whether the identifying information for user B1 228 appears in global white-list 224 with the specified transactional identifier (1106). If it finds an entry for user B1 228 in connection with the earlier specified transactional identifier, the entry is removed from global white-list 224 (1108). Alternatively, the entry for user B1 228 may be inactivated rather than removed. Next, CSPA e-mail server system 208 determines whether the identifying information for user B1 228 with the transactional identifier appears in personal white-list 226 associated with user A1 222 (1110). If it is found, it is removed (or inactivated) from personal white-list 226 associated with user A1 222 (1112). Although not depicted in FIG. 11, the process may perform an additional check of any global and personal black-lists to determine whether user B1 228 was previously inactivated or removed from a black-list during the transactional white-listing process. That check may be performed by looking for an entry for user B1 228 with the associated transactional identifier in the black-lists. If the process finds such an entry, it may reactivate the black-list entry for user B1 228 by removing the transactional identifier and any other transactional metadata.

In some implementations, rather than using a transactional identifier to determine which entries to remove from the white-lists, an entry is simply added and removed for user B1 228 without the use of a transactional identifier and irrespective of whether user B1 228 already appears in white-lists 224, 226. In such an implementation, it may be possible for user B1 228 to appear more than once in the white-lists. This implementation trades the speed of not having to search the white-lists for the transactional identifier for a method and system potentially requiring more storage space to store possible duplicate entries in white-lists 224, 226.

Figure 12:
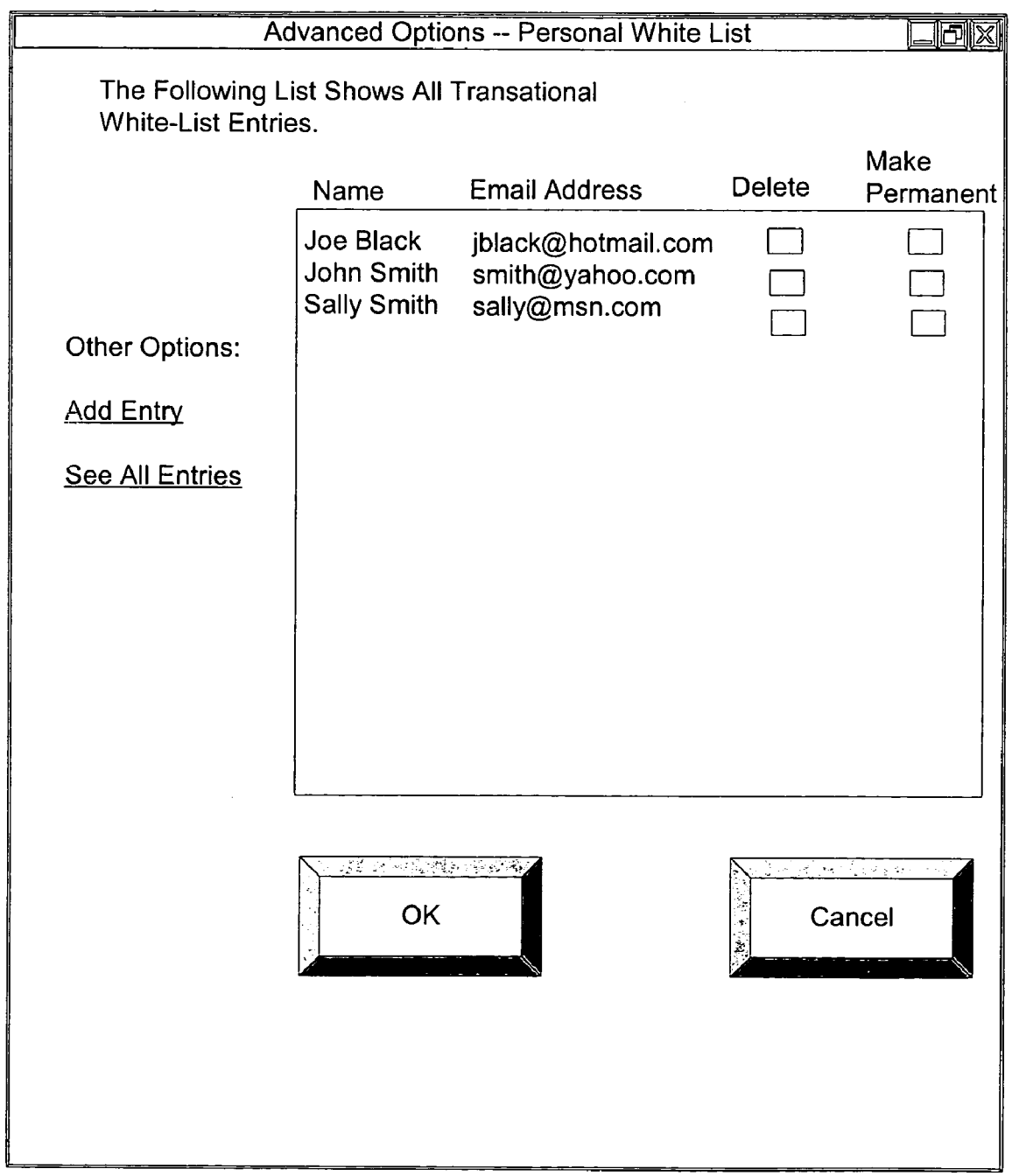
FIG. 12 is an example user interface that may be employed by a transactional white-listing system.

Alternatively, the entry for user B1 228 may be converted to a more permanent white-list entry instead of being removed or inactivated. This can be done by system 208 removing the transactional identifier and other metadata that previously indicated that the entry was a transactional entry. The decision to make a user more permanent may be made by user A1 222 or by CSPA e-mail server system 208. For example, either may specify that once user B1 228 has sent a set number of threshold e-mails, user B1 228 should be permanently added to white-lists 224, 226. The thresholds may be based on an absolute number of e-mails or a rate of the e-mails. The decision to make an entry more permanent also may be made by user A1 222 through a pop-up or other notification informing the user that a certain white-listed person is about to be removed and giving user A1 222 a chance to keep user B1 white-listed. Similarly, an advanced mode window 1200, as shown in FIG. 12, can be used by more sophisticated users to manage their own white-lists. In the illustrated advanced mode window 1200, users may navigate options to see the transactional entries in their personal white-list 226 and select options to delete entries or make entries more permanent. This process can be implemented in a number of ways. If the user selects an option to make an entry permanent, for example, CSP e-mail server system 208 can remove the transactional identifier from the database entry of the transactionally white-listed user, or it may duplicate the entry without associating the transactional information (e.g., transactional identifier, expiration identifier) Depending on implementation, additional information, such as an expiration date, entry-added date, or the transactional identifier, may be presented in window 1200. The advanced mode window 1200 also may include the date the transactional entry was added to personal white-list 226 or other such information to assist user A1 222 in determining whether to delete or to make permanent an entry. Furthermore, the system 208 may be implemented to notify user A1 222 each time a transactionally white-listed user is about to be removed from the white-lists and to ask user A1 222 whether the transactionally white-listed user should be entered as a non-transactional entry into the white-lists.

Several other implementations of the transactional white-listing systems and methods are possible to transactionally white-list users or entities. In one such implementation, for instance, the third-party service provider system 206 may be a Web browser running on the local computer of user A1 222. The Web browser may monitor the actions of user A1 222 to observe situations in which user A1 222 may need to receive communications from other users or entities. For example, the Web browser may observe that user A1 clicks on button 506 (see FIG. 5) to ask an online auction seller a question or clicks on button 802 (see FIG. 8) to make an online purchase. The Web browser then may initiate an out-of-band communication with CSPA to inform CSPA to transactionally white-list the appropriate users or entities, thereby ensuring that, for at least a limited time, user A1 222 can receive communications from the transactionally white-listed users or entities. In this implementation, the same methods can be used to perform the transactional white-listing as those described above.

Although the described methods add the transactional white-listed entries into a common white-list that includes both permanent and transactional entries, some implementations may use a separate white-list for the transactional white-listed entries. This separate transactional white-list (either alone or in combination with a standard white-list) would override other spam lists and filters used by CSPA and user A1. The above-disclosed systems and method apply equally with such a separate white-list, excepting that the separate transactional white-list would not need a transactional ID as all entries in the list, by virtue of being in the list, would be known to be transactional in nature.

As explained above, the transactional white-listing systems and methods can be implemented in many different contexts, such as IM systems, caller ID systems, and message or chat board systems. In an IM system, for instance, instant messages sent to a particular intended recipient may be filtered through a global white-list maintained by an IM host system and/or a personal white-list associated only with the particular intended recipient. The personal white-list may be stored by the IM host system or the local IM client running on the computer or other IM-enabled device (e.g., cell phone, personal digital assistant) used by the particular intended recipient. In one implementation, CSPA communications server system 108 (see FIG. 1) is the IM host system and communications application system 110 is the IM client system of the intended recipient. Likewise, CSPB communications server system 114 is an IM host system, which may be the same or a different IM host system than the IM host system used by the intended recipient. A third-party service provider system thus can effect the transactional white-listing of an IM user through sending an out-of-band communication to the IM host system associated with the intended recipient. Examples of IM systems include, but are not limited to, AIM (America Online Instant Messenger), Yahoo Messenger, MSN Messenger, and ICQ. Additional information on IM systems may be found in "How the Internet Works" by Preston Gralla, which is incorporated by reference.

In further implementations, such as those where the same IM host system is used by both the intended recipient and the sending user, the IM host system may add the IM screen name of the intended recipient to the buddy list of the sending user to facilitate communications between the sending user and the intended recipient. The screen name of the intended recipient may be added for only the period during which the sending user is transactionally white-listed. Upon occurrence of an end trigger that removes the sending user from the global and/or personal white-lists, the IM host system removes the screen name of the intended recipient from the buddy list of the sending user.

In the context of a caller ID system, the transactional white-listing systems and methods ensure that, at least for some transactional period, an intended call recipient is able to receive telephone calls from a person or entity that might otherwise be blocked by caller ID rules. For example, if a user visits a vender website to receive help on a newly purchased computer or other product, the user may select a "call me back" option to have a vender representative call the user to discuss the problems. The vendor website system may send an out-of-band communication to effect the transactional white-listing of the phone number for the vender representative. Additionally, if the caller ID rules of the intended call recipient would normally block all calls from such a commercial phone number, an exception is created to allow a call to be received from the specified phone number of the vendor representative for a transactional period. The changes made to the white-list, black-list, or other rule filtering systems may be stored on a communications server system responsible for filtering received calls. In one example, such systems use automatic number identification (ANI) data stored at a home unit for monitoring multiple home communications (e.g., e-mail, telephone, other Web-based communications).

It will be understood that various modifications may be made without departing from the spirit and scope of the claims. For example, advantageous results still could be achieved if steps of the disclosed processes are performed in a different order and/or if components in the disclosed systems are combined in a different manner and/or replaced or supplemented by other components. Accordingly, other implementations are within the scope of the following claims.

What is claimed is:

1. A method of facilitating electronic communications, the method comprising:

filtering, at a communications service provider associated with a recipient, messages sent to the recipient from a sender by applying message filtering rules associated with the recipient, the message filtering rules being configured to block at least one future message from the sender;

receiving, at the communications service provider, an electronic communication from a third party service provider, the third party service provider being configured to facilitate a transaction of goods or services between the sender and the recipient, and the received electronic communication being configured to be used by the communications service provider to enable the recipient to receive the at least one future message from the sender at a future time for a limited amount of time, the at least one future message being associated with the transaction for goods or services between the sender and the recipient;

in response to receipt of the electronic communication from the third party service provider, modifying the message filtering rules associated with the recipient to enable the recipient to receive the at least one future message from the sender during the limited amount of time;

enabling receipt by the recipient of messages, including the at least one future message, until the limited amount of time has lapsed; and after the limited amount of time has lapsed, changing the message filtering rules associated with the recipient to again filter messages from the sender as if the electronic communication from the third party service provider had not been received by the communications service provider.

2. The method of claim 1, wherein the transaction comprises a potential future transaction.

3. The method of claim 1, wherein the transaction comprises a transaction that occurred prior to receipt of the electronic communication by the communications service provider.

4. The method of claim 1, wherein the third party service provider is configured to enable users or entities to find and purchase goods or services offered by other users or other entities online.

5. The method of claim 4, wherein the transaction comprises a purchase by the recipient of goods or services offered by the sender.

6. The method of claim 5, wherein the third party service provider facilitates the transaction by displaying an offer by the sender of the goods or services to the recipient.

7. The method of claim 4, wherein:

the third party service provider is configured to enable the users or the entities to auction goods or services to the other users or the other entities online, and the transaction comprises a purchase or a potential future purchase by the recipient of goods or services offered by the sender in an auction.

8. The method of claim 7, wherein the at least one future message comprises a message that includes information sent by the sender to answer a question by the recipient regarding the auction.

9. The method of claim 8, wherein the electronic communication is sent by the third party service provider to the communications service provider in response to the recipient submitting, to the third party service provider, a question for the seller regarding the auction.

10. The method of claim 1, wherein the third party service provider is configured to enable users to find information online about goods or services offered by entities in a particular geographic area.

11. The method of claim 10, wherein the sender comprises one of the entities.

12. The method of claim 11, wherein the particular geographic area is a city and the entities include at least one of local realtors, private high schools, and utility companies offering services in the city.

13. The method of claim 1, wherein:
the third party service provider is configured to enable users to purchase goods from the third party service provider, and
the transaction comprises a purchase, by the recipient, of shipping services offered by the sender to ship goods purchased by the recipient from the third party service provider.

14. The method of claim 13, wherein the at least one future message comprises a message that includes shipping or order information for the goods purchased by the recipient from the third party service provider.

15. The method of claim 14, wherein the electronic communication is sent by the third party service provider to the communications service provider in response to the recipient purchasing the goods from the third party service provider.

16. The method of claim 1, wherein:
the third party service provider is configured to facilitate a transaction to purchase airline tickets by the recipient from the sender, and
the transaction comprises a purchase, by the recipient, of airline tickets offered by the sender.

17. The method of claim 13, wherein the at least one future message comprises a message that includes flight updates.

18. The method of claim 16, wherein the electronic communication is sent by the third party service provider to the communications service provider in response to the recipient purchasing the airline tickets from the sender.

19. The method of claim 1, wherein receiving an electronic communication from the third party service provider includes receiving the electronic communication over a trusted channel between the third party service provider and the communications service provider.

20. The method of claim 19, wherein the trusted channel comprises a channel over a virtual private network.

21. The method of claim 19, wherein the trusted channel comprises a non-anonymous channel.

22. The method of claim 1, wherein modifying the message filtering rules associated with the recipient includes:
determining whether identifying information for the sender appears in a white-list associated with the recipient; and
adding the identifying information for the sender to the white-list associated with the recipient in response to a determination that the identifying information for the sender does not appear in the white-list associated with the recipient.

23. The method of claim 22, wherein changing the message filtering rules associated with the recipient comprises deleting the identifying information for the sender from the white-list associated with the recipient after the limited amount of time has lapsed.

24. The method of claim 23, wherein changing the message filtering rules further includes:
notifying the recipient that the sender is scheduled to be removed from the white-list; and
asking the recipient whether the sender should be kept in the white-list.

25. The method of claim 22, wherein the identifying information for the sender comprises an e-mail address for the sender.

26. The method of claim 1, wherein modifying the message filtering rules associated with the recipient includes:
determining whether the communication service provider has a global white-list for message filtering;
if it is determined that the communications service provider has a global white-list, automatically adding information identifying the sender and a transactional identifier to an entry in the global white-list, the transactional identifier indicating that the entry is associated with the transaction of goods or services between the sender and the recipient;
determining whether the recipient has a personal white-list for message filtering; and
if the recipient has a personal white-list, automatically adding the information identifying the sender and the transactional identifier to an entry in the personal white list of the recipient.

27. The method of claim 26, wherein automatically adding information identifying the sender and a transactional identifier to the global white-list includes adding a type indicator, the type indicator permitting special handling of messages.

28. The method of claim 26, further comprising:
determining whether the communications service provider has a global black-list for message filtering;
if it is determined that the communication service provider has a global black-list, determining whether the sender is blocked by the global black-list from sending messages to the recipient, and automatically modifying the global black-list to permit the sender to send messages to the recipient;
determining whether the recipient has a personal black-list for message filtering; and
if the recipient has a personal black-list, determining whether the sender is blocked by the personal black-list from sending messages to the recipient, and automatically modifying the personal black-list to permit the sender to send messages to the recipient.

29. The method of claim 1, wherein the communications service provider comprises an e-mail service provider.

30. The method of claim 29, wherein modifying the message filtering rules associated with the recipient includes:
adding an e-mail address of the sender to a list of approved e-mail sender addresses associated with the recipient, whereby the recipient can receive e-mail from the sender; and
deleting the e-mail address of the sender from the list of approved e-mail sender addresses associated with the recipient in response to completion of a specified end trigger associated with the transaction for goods or services between the sender and the recipient.

31. The method of claim 30, wherein adding the e-mail address for the e-mail sender includes adding the e-mail address and a transactional identifier to an entry in the list of approved e-mail sender addresses, the transactional identifier associating the entry with the transaction for goods or services between the sender and the recipient.

32. The method of claim 30, wherein adding the e-mail address for the sender includes adding a time stamp.

33. The method of claim 30, wherein the specified end trigger is receipt of a second electronic communication from the third party service provider by the communications service provider, the second electronic communication indicating that the e-mail address for the sender should be removed from the list of approved e-mail sender addresses associated with the recipient.

34. The method of claim 30, wherein adding the e-mail address for the sender includes adding an expiration date.

35. The method of claim 34, wherein the specified end trigger includes expiration of the expiration date.

36. The method of claim 30, wherein the specified end trigger includes an action initiated by the communications service provider.

37. The method of claim 30, wherein the specified end trigger includes an action initiated by the e-mail service provider.

38. The method of claim 30, wherein the specified end trigger includes expiration of a specified time duration.

39. The method of claim 30, wherein the specified end trigger includes receipt of an e-mail from the sender by the recipient.

40. The method of claim 30, wherein the specified end trigger includes receipt by the recipient of a threshold number of e-mails from the sender.

41. The method of claim 1, further comprising:
filtering, at the communications service provider, messages sent to the sender from the recipient by applying message filtering rules associated with the sender;
in response to receipt of the electronic communication from the third party service provider, modifying the message filtering rules associated with the sender to enable the sender to receive messages from the recipient during the limited amount of time;
enabling receipt by the sender of messages from the recipient until the limited amount of time has lapsed; and
after the limited amount of time has lapsed, changing the message filtering rules associated with the sender as if the electronic communication from the third party service provider had not been received by the communications service provider.

42. The method of claim 41, wherein modifying the message filtering rules associated with the sender includes:
determining whether identifying information for the recipient appears in a white-list associated with the sender; and
adding the identifying information for the recipient to the white-list associated with the sender in response to a determination that the identifying information for the recipient does not appear in the white-list associated with the sender.

43. The method of claim 1, wherein the message filtering rules are configured to block all of the messages from the sender.

44. The method of claim 1, wherein:
modifying the message filtering rules includes placing a user identifier of the sender on a white list, and
after the limited amount of time has lapsed, changing the message filtering rules comprises removing the user identifier of the sender from the white list.

45. A computer system for automatically configuring message filtering rules, the computer system including:
a communications gateway configured to receive, at a communications service provider associated with a message recipient, an electronic communication from a third party service provider, the third party service provider being configured to facilitate a transaction of goods or services between a message sender and the message recipient, and the received electronic communication being configured to be used by the communications service provider to enable the message recipient to receive at least one future message from the message sender at a future time for a limited amount of time, the at least one future message being associated with the transaction for goods or services between the message sender and the message recipient; and
a communications filter system configured to:
filter, at the communications service provider, messages sent to the message recipient from the message sender by applying message filtering rules associated with the message recipient,
modify, in response to receipt of the electronic communication from the third party service provider, the message filtering rules associated with the message recipient to enable the recipient to receive messages from the message sender during the limited amount of time,
enable receipt by the message recipient of messages, including the at least one future message, until the limited amount of time has lapsed, and
after the limited amount of time has lapsed, change the message filtering rules associated with the message recipient to again filter messages from the message sender as if the electronic communication from the third party service provider had not been received by the communications service provider.

46. The computer system of claim 45, wherein the third party service provider is configured to enable users or entities to find and purchase goods or service offered by other users or other entities online.

47. The computer system of claim 45, wherein the transaction comprises a purchase by the recipient of goods or services offered by the sender.

48. The computer system of claim 47, wherein the third party service provider facilitates the transaction by displaying an offer by the sender of the goods or services to the recipient.

49. The computer system of claim 45, wherein:
the communications service provider comprises an e-mail system;
the at least one future message comprises at least one future e-mail to be sent by the message sender to the message recipient in the future; and
the e-mail system is configured to receive the electronic communication from the third party service provider over a trusted channel.

50. The computer system of claim 49, wherein the trusted channel comprises a channel over a virtual private network.

51. An apparatus for facilitating electronic communications, the apparatus comprising:
means for filtering, at a communications service provider associated with a recipient, messages sent to the recipient from a sender by applying message filtering rules associated with the recipient;
means for receiving, at the commumcations service provider, an electronic communication from a third party service provider, the third party service provider being configured to facilitate a transaction of goods or services between the sender and the recipient, and the received electronic communication being configured to be used by the communications service provider to enable the recipient to receive at least one future message ftom the sender at a future time for a limited amount of time, the at least one future message being associated with the transaction for goods or services between the sender and the recipient;

means for modifying, in response to receipt of the electronic communication from the third party service provider, the message filtering rules associated with the recipient to enable the recipient to receive messages from the sender during the limited amount of time;
means for enabling receipt by the recipient of messages, including the at least one future message, until the limited amount of time has lapsed; and means for changing, after the limited amount of time has lapsed, the message filtering rules associated with the recipient to again filter messages from the sender as if the electronic communication from the third party service provider had not been received by the communications service provider.

* * * * *